(12) United States Patent
Yang et al.

(10) Patent No.: US 11,843,491 B2
(45) Date of Patent: Dec. 12, 2023

(54) TONE PLAN FOR WIRELESS COMMUNICATION

(71) Applicant: QUALCOMM Incorporated, San Diego, CA (US)

(72) Inventors: Lin Yang, San Diego, CA (US); Bin Tian, San Diego, CA (US); Youhan Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 17/190,216

(22) Filed: Mar. 2, 2021

(65) Prior Publication Data

US 2021/0281454 A1 Sep. 9, 2021

Related U.S. Application Data

(60) Provisional application No. 62/984,776, filed on Mar. 3, 2020.

(51) Int. Cl.
*H04L 27/26* (2006.01)
*H04L 5/00* (2006.01)
*H04L 1/00* (2006.01)

(52) U.S. Cl.
CPC ........ *H04L 27/2603* (2021.01); *H04L 1/0068* (2013.01); *H04L 5/0048* (2013.01); *H04L 5/0094* (2013.01); *H04L 27/2613* (2013.01)

(58) Field of Classification Search
None
See application file for complete search history.

(56) References Cited

U.S. PATENT DOCUMENTS

| 2017/0265240 | A1 | 9/2017 | Chen et al. |
| 2017/0311292 | A1 | 10/2017 | Choi et al. |
| 2019/0253111 | A1* | 8/2019 | Zheng ............... H04B 17/318 |
| 2020/0008185 | A1 | 1/2020 | Chen et al. |
| 2021/0067283 | A1* | 3/2021 | Hart .................. H04L 27/2602 |
| 2021/0281376 | A1* | 9/2021 | Park ................... H04L 5/0044 |

FOREIGN PATENT DOCUMENTS

WO 2018152224 8/2018

OTHER PUBLICATIONS

"PCT Application No. PCT/US2021/020635 International Search Report and Written Opinion", dated Jul. 2, 2021, 10 pages.
IEEE, "IEEE P802.11ax™/D3.0", Draft Standard for Information technology—Telecommunications and information exchange between systems Local and metropolitan area networks—Specific requirements, Jun. 2018, 682 pages.

* cited by examiner

*Primary Examiner* — Diane L Lo
(74) *Attorney, Agent, or Firm* — Holland & Hart LLP

(57) ABSTRACT

This disclosure provides methods, devices and systems that support communicating using orthogonal frequency division multiple access (OFDMA) according to a tone plan that supports 20 MHz subchannel puncturing within a wireless channel. In some aspects, a non-legacy tone plan may define a set of tones for a resource unit (RU) such that the RU does not overlap a 20 MHz subchannel boundary of the wireless channel. The locations of the set of tones in the non-legacy tone plan may be shifted relative to corresponding tones associated with a corresponding RU according to a legacy tone plan. One or more of the disclosed tone plans may enable puncturing of subchannels while making use of some RUs that would otherwise partially overlap a punctured subchannel in the legacy tone plan.

30 Claims, 13 Drawing Sheets

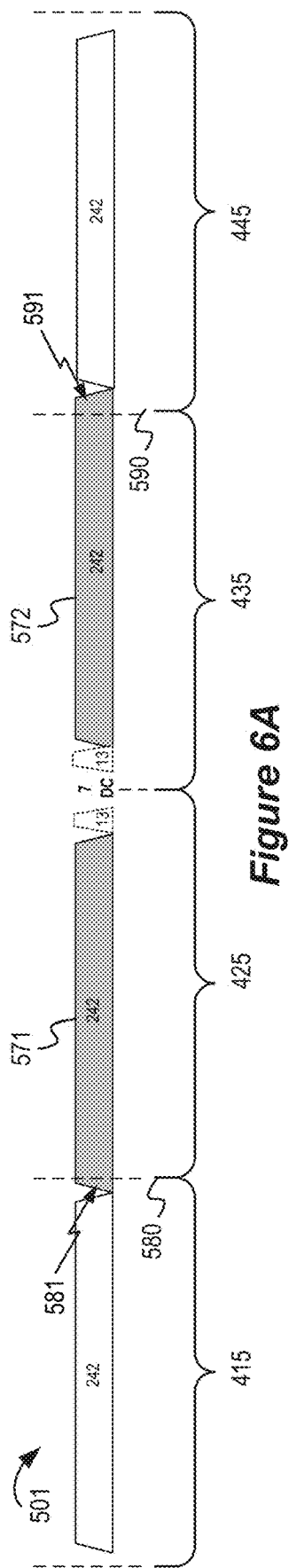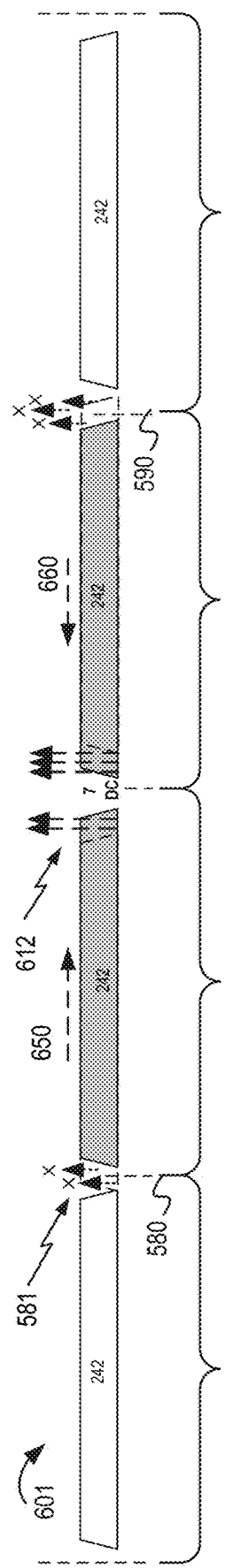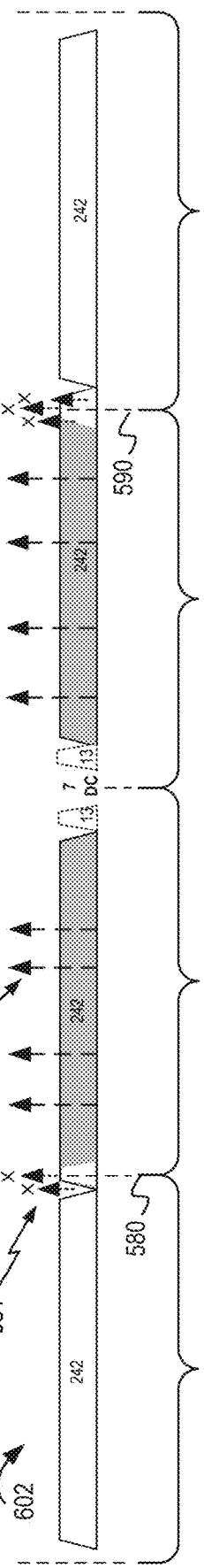

| RU type | RU index and subcarrier range | | | | |
|---|---|---|---|---|---|
| 26-tone RU | RU 1 [-499: -474] | RU 2 [-473: -448] | RU 3 [-445: -420] | RU 4 [-419: -394] | RU 5 [-392: -367] |
| | RU 6 [-365: -340] | RU 7 [-339: -314] | RU 8 [-311: -286] | RU 9 [-285: -260] | |
| | RU 10 [-252: -227] | RU 11 [-226: -201] | RU 12 [-198: -173] | RU 13 [-172: -147] | RU 14 [-145: -120] |
| | RU 15 [-118: -93] | RU 16 [-92: -67] | RU 17 [-64: -39] | RU 18 [-38: -13] | RU 19 Deleted |
| | RU 20 [13: 38] | RU 21 [39: 64] | RU 22 [67: 92] | RU 23 [93: 118] | RU 24 [120: 145] |
| | RU 25 [147: 172] | RU 26 [173: 198] | RU 27 [201: 226] | RU 28 [227: 252] | |
| | RU 29 [260: 285] | RU 30 [286: 311] | RU 31 [314: 339] | RU 32 [340: 365] | RU 33 [367: 392] |
| | RU 34 [394: 419] | RU 35 [420: 445] | RU 36 [448: 473] | RU 37 [474: 499] | |
| 52-tone RU | RU 1 [-499: -448] | RU 2 [-445: -394] | RU 3 [-365: -314] | RU 4 [-311: -260] | |
| | RU 5 [-252: -201] | RU 6 [-198: -147] | RU 7 [-118: -67] | RU 8 [-64: -13] | |
| | RU 9 [13: 64] | RU 10 [67: 118] | RU 11 [147: 198] | RU 12 [201: 252] | |
| | RU 13 [260: 311] | RU 14 [314: 365] | RU 15 [394: 445] | RU 16 [448: 499] | |
| 106-tone RU | RU 1 [-499: -394] | RU 2 [-365: -260] | RU 3 [-252: -147] | RU 4 [-118: -13] | |
| | RU 5 [13: 118] | RU 6 [147: 252] | RU 7 [260: 365] | RU 8 [394: 499] | |
| 242-tone RU | RU 1 [-500: -259] | RU 2 [-253: -12] | RU 3 [12: 253] | RU 4 [259: 500] | |
| 484-tone RU | RU 1 [-500: -259, -253: -12] | | RU 2 [12: 253, 259: 500] | | |
| 996-tone RU | RU 1 [-500: -3, 3: 500] | | | | |

*Figure 13*

TONE PLAN FOR WIRELESS COMMUNICATION

CROSS-REFERENCE TO RELATED APPLICATIONS

This Patent Applications claims priority to U.S. Provisional Patent Application No. 62/984,776, filed Mar. 3, 2020, entitled "TONE PLANS FOR PUNCTURED WIRELESS COMMUNICATIONS," and assigned to the assignee hereof. The disclosure of the prior Applications is considered part of and is incorporated by reference in this Patent Applications.

TECHNICAL FIELD

This disclosure relates generally to wireless communications, and more specifically, to tone plans usable for punctured wireless communications.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

A wireless communication medium may be referred to as a wireless channel. A wireless channel having a larger bandwidth may span a frequency range that was previously defined by multiple subchannels of smaller bandwidth. Some WLAN devices may share a wireless channel using a division based on the subchannels. More recent techniques for sharing a wireless channel can be based on a combination of frequency-based and time-based allocations. For example, different users (or groups of users) may be assigned to different resource units (RUs) that represent subcarriers within a tone plan for a wireless channel. RUs may be assigned to users for a single user (SU) transmission or for a multi-user (MU) transmission. The available frequency spectrum of the wireless channel may be divided into multiple RUs that can be allocated to different STAs or groups of STAs.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication by a wireless access point. In some implementations, the method may include allocating at least a first resource unit (RU) associated with a wireless channel to include data for a first wireless station. The method may include transmitting the data for the first wireless station via a first set of tones associated with the first RU according to a non-legacy tone plan. The locations of the first set of tones in the non-legacy tone plan may be shifted relative to corresponding tones associated with a corresponding RU according to a legacy tone plan such that the first set of tones for the first RU do not overlap a 20 MHz subchannel boundary of the wireless channel associated with the first RU.

Another innovative aspect of the subject matter described in this disclosure can be implemented in a method for wireless communication by a wireless station. In some implementations, the method may include receiving, from a wireless access point, an indication of an allocation of at least a first RU of a wireless channel allocated for the wireless station to transmit data. The method may include transmitting the data to the wireless access point via a first set of tones associated with the first RU according to a non-legacy tone plan. The locations of the first set of tones in the non-legacy tone plan may be shifted relative to corresponding tones associated with a corresponding RU according to a legacy tone plan such that the first set of tones for the first RU do not overlap a 20 MHz subchannel boundary of the wireless channel associated with the first RU.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 6A shows the 242-tone RUs from the example 80 MHz tone plan of FIG. 5.

FIG. 6B shows an example of tone shifting for 242-tone RUs according to some implementations.

FIG. 6C shows an example of pilot tone replacement for 242-tone RUs according to some implementations.

FIG. 13 shows example RU definitions in terms of tone indices according to some implementations.

Like reference numbers and designations in the various drawings indicate like elements.

DETAILED DESCRIPTION

Figure 1:
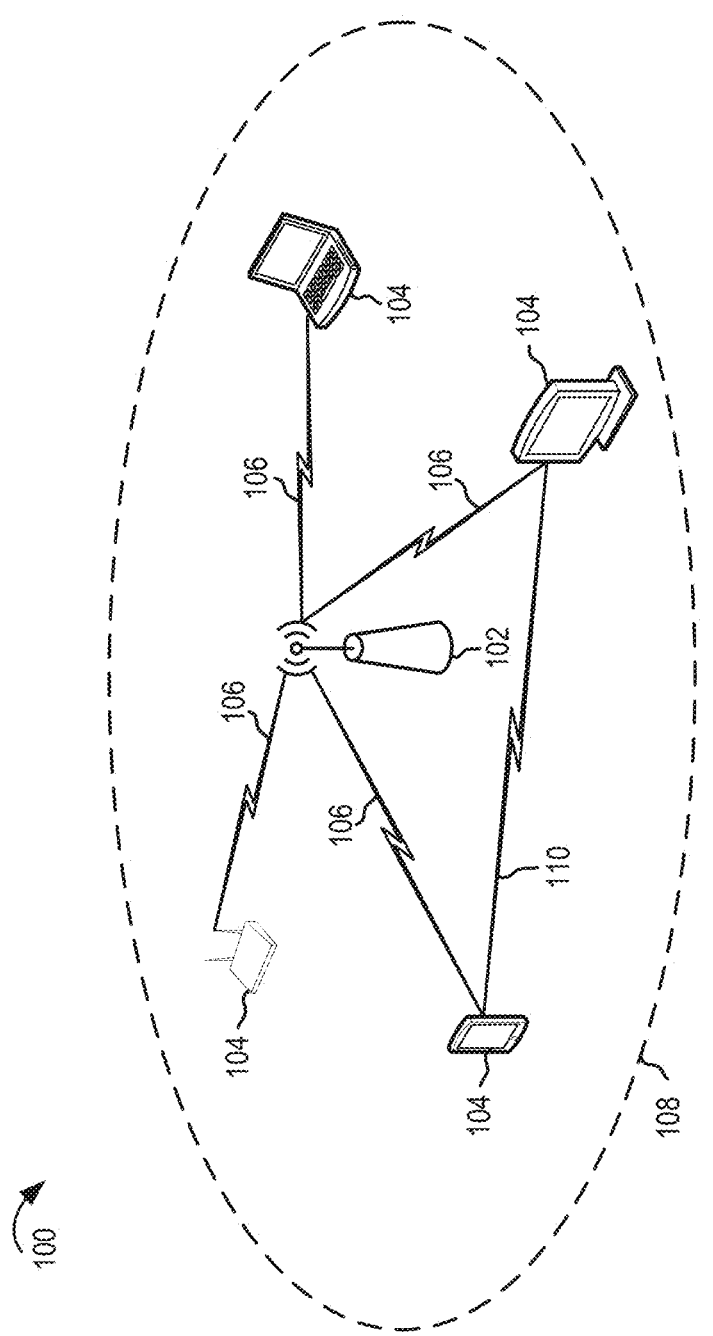
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G standards, among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal frequency division multiple access (OFDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (JOT) network.

Various aspects generally relate to tone plans for wireless communication. Some aspects more specifically relate to tone plans that define the locations of data tones for various resource units (RUs) within a wireless channel based on 20 MHz subchannel boundaries within the wireless channel. A tone plan indicates sets of tones (also referred to as subcarriers or frequencies) that are combined to form RUs of various bandwidth sizes. In some aspects, the described tone plans are designed such that no RUs overlap any 20 MHz subchannel boundaries, which are located at fixed frequencies within the wireless channel. Some aspects of the described tone plans may enable puncturing of 20 MHz subchannels while making use of some RUs that would otherwise partially overlap the punctured subchannels. In various examples, the tone plans may be designed for a wireless channel having an 80 MHz, 160 MHz, 240 MHz or 320 MHz total bandwidth. Some examples of the described tone plans may be based on one or more modifications or adjustments to a legacy tone plan that includes some RUs that partially overlap 20 MHz subchannel bandwidth boundaries. According to some aspects, particular RUs in the disclosed tone plans are adjusted or shifted relative to the corresponding RUs in the legacy tone plans such that the RUs in the new tone plans do not overlap 20 MHz subchannel boundaries while maintaining a same quantity of data tones as in the legacy tone plan. In some examples, a technical specification may define the described tone plans or may define modifications or adjustments that may be made dynamically to the legacy tone plans to support 20 MHz subchannel puncturing.

Particular implementations of the subject matter described in this disclosure can be implemented to realize one or more of the following potential advantages. Some implementations enable an increase in efficiency, an increase in throughput or a reduction in latency by enabling the allocation of RUs that would otherwise interfere with signals of an incumbent system utilizing frequencies within a punctured subchannel, or that would not be allocated at all due to their overlap with the punctured subchannel. Thus, the tone plans described herein may improve performance of the wireless channel. Furthermore, because at least some of the tone plans described herein provide an equivalent number of tones as compared to corresponding RUs in a legacy tone plan, the disclosed tone plans can be implemented without reducing the amount of data that may be carried by the RUs.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish or maintain a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a Wi-Fi link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU is equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a Wi-Fi link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or select among multiple APs 102 that together form an extended service set (ESS) including multiple connected BSSs. An extended network station associated with the WLAN 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) connections. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective Wi-Fi links 106) according to the IEEE 802.11 family of standards (such as that defined by the IEEE 802.11-2016 specification or amendments thereof including, but not limited to, 802.11ah, 802.11ay, 802.11ax, 802.11az, 802.11ba and 802.11be (which also may be referred to as Extremely High Throughput (EHT))). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer (PHY) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Some APs and STAs support beamforming. Beamforming refers to the focusing of the energy of a transmission in the direction of a target receiver. Beamforming may be used both in a single user context, for example, to improve a signal-to-noise ratio (SNR), as well as in a multi-user (MU) context, for example, to enable MU multiple-input multiple-output (MIMO) transmissions. To perform beamforming, a transmitter, referred to as the beamformer, transmits a signal from multiple antenna elements of an antenna array. The beamformer configures the phase shifts between the signals transmitted from the different antenna elements such that the signals add constructively along particular directions towards the intended receivers, which are referred to as beamformees. The manner in which the beamformer configures the phase shifts depends on channel state information associated with the wireless channels over which the beamformer intends to communicate with the beamformees. To obtain the channel state information, the beamformer may perform a channel sounding procedure with the beamformees. For example, the beamformer may transmit one or more sounding packets to the beamformees. The beamformees may then perform measurements of the channel based on the sounding packets and subsequently provide feedback to the beamformer based on the measurements, for example, in the form of a feedback matrix. The beamformer may then then generate a steering matrix for each of the beamformees based on the feedback and use the steering matrix to configure the phase shifts for subsequent transmissions to the beamformees.

Each of the frequency bands may include multiple sub-bands or frequency channels. For example, PPDUs conforming to the IEEE 802.11n, 802.11ac and 802.11ax standard amendments may be transmitted over the 2.4 and 5 GHz bands, each of which is divided into multiple 20 MHz bandwidth channels. As such, these PPDUs are transmitted over a physical channel having a minimum bandwidth of 20 MHz. But larger channels can be formed through channel bonding. For example, PPDUs conforming to the IEEE 802.11n, 802.11ac and 802.11ax standard amendments may be transmitted over physical channels having bandwidths of 40 MHz, 80 MHz, or 160 MHz by bonding together two or more 20 MHz bandwidth channels. Newer technologies may support the use of wide bandwidth channels, for example, physical channels having bandwidths of 240 MHz, 320 MHz or greater.

Each PPDU is a composite structure that includes a PHY preamble and a physical layer convergence protocol (PLCP) service data unit (PSDU). The information provided in the preamble may be used by a receiving device to decode the subsequent data in the PSDU. A legacy portion of the preamble may include a legacy short training field (STF) (L-STF), a legacy long training field (LTF) (L-LTF), and a legacy signaling field (L-SIG). The legacy preamble may be used for packet detection, automatic gain control and channel estimation, among other uses. The legacy preamble also may be used to maintain compatibility with legacy devices. In instances in which PPDUs are transmitted over a bonded channel, the L-STF, L-LTF, and L-SIG fields may be duplicated and transmitted in each of the multiple component channels. For example, in IEEE 802.11n, 802.11ac or 802.11ax implementations, the L-STF, L-LTF, and L-SIG fields may be duplicated and transmitted in each of the component 20 MHz bandwidth channels. The format of, coding of, and information provided in the non-legacy portion of the preamble is based on the particular IEEE 802.11 protocol.

In some implementations, APs 102 and STAs 104 can support multi-user (MU) transmissions; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UP) transmissions from corresponding STAs 104 to an AP 102). To support the MU transmissions, the APs 102 and STAs 104 may utilize multi-user orthogonal frequency division multiple access (MU-OFDMA) and multi-user multiple-input, multiple-output (MU-MIMO) techniques. OFDMA is a communication technology that uses RUs to allocate different resources within the full channel bandwidth to one or more users (or groups of users). OFDMA may be used for MU communication or single user (SU) communication.

Using OFDMA, the available frequency spectrum of the wireless channel may be divided into multiple RUs. Each RU may include a number of different frequency subcarriers ("tones"). A tone plan may specify sets of tones that are associated with each potential RU in the wireless channel. Different RUs may be allocated or assigned by an AP 102 to different STAs 104 at particular times. The sizes and distributions of the RUs allocated to each STA 104 may be referred to as an RU allocation. In addition to specifying the tones associated with corresponding RUs, the tone plan also may define unused subcarriers (such as a guard band, DC subcarriers or null subcarriers) that may separate some RUs. For example, the null subcarriers may separate some RUs to reduce interference between adjacent RUs, to reduce receiver DC offset, or to avoid transmit center frequency leakage. The tone plan also may define how many RUs can be accommodated within a total channel bandwidth. For example, four 242-tone RUs (which also may be referred to as RU242s) may be defined within a tone plan for an 80 MHz channel bandwidth.

The RUs defined within a legacy tone plan may overlap subchannel boundaries within a wireless channel. Using the example of an 80 MHz channel bandwidth, there may be four adjacent 20 MHz bandwidth subchannels. As previously described, the legacy tone plan for an 80 MHz channel bandwidth may define some RUs that overlap a 20 MHz bandwidth subchannel boundary. In instances in which it is desired to puncture one or more of the 20 MHz subchannels, the use of those overlapping RUs may cause interference. Some legacy systems may limit the use of such overlapping RUs or may restrict the sizes of such RUs. As a result, systems that use a legacy tone plan may be inefficient or inadequate for 20 MHz subchannel puncturing.

Figure 2:
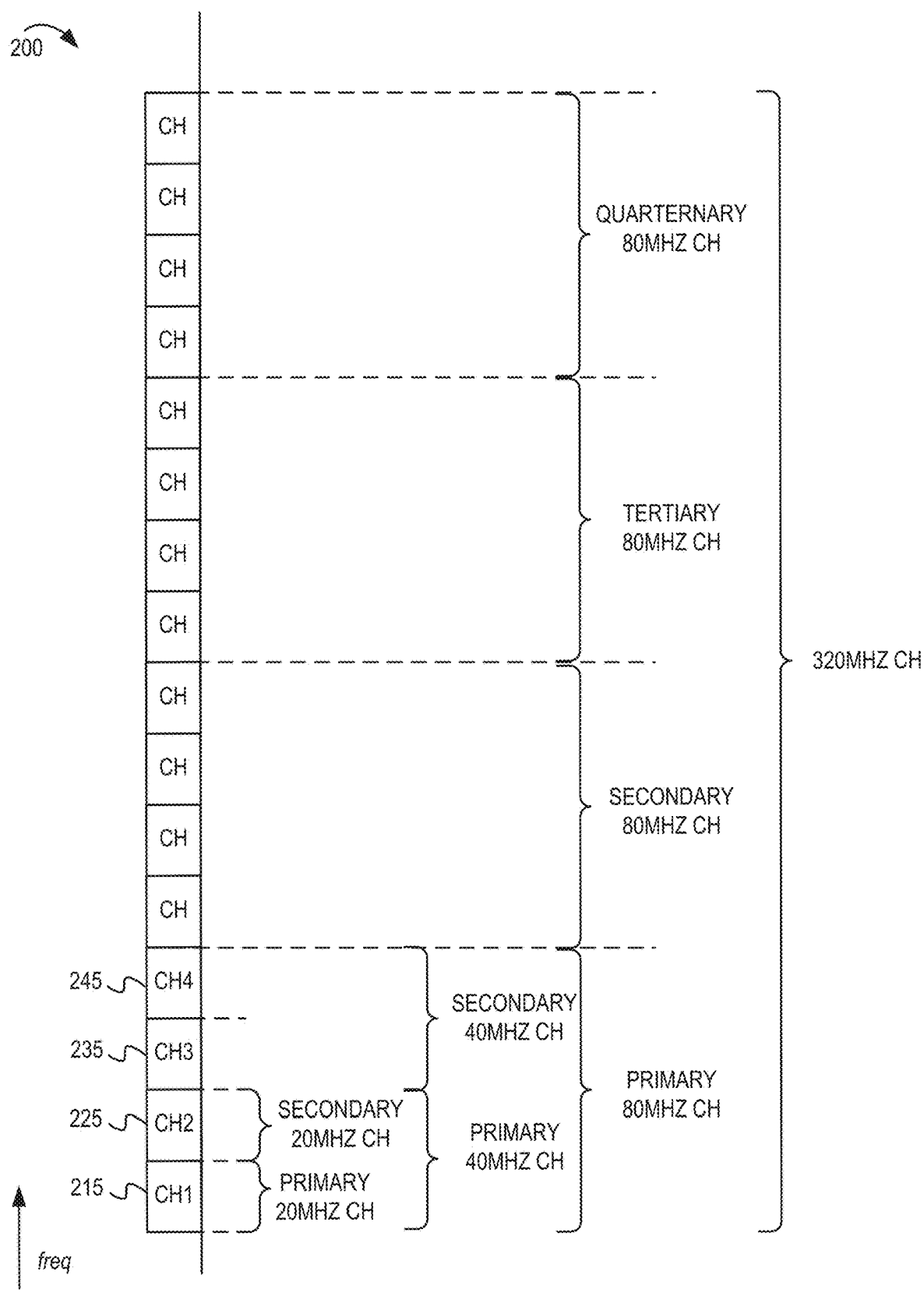
FIG. 2 shows an example wide bandwidth channel.

FIG. 2 shows an example wide bandwidth channel. A frequency band (such as the 2.4 GHz, 5 GHz, or 6 GHz frequency band) may define multiple channels and subchannels (also referred to herein simply as "channels"). Each subchannel may have a uniform bandwidth (such as 20 MHz). As described above, some WLAN devices are capable of transmitting at larger bandwidths by concurrently using multiple subchannels (referred to as "channel bonding"). In the example of FIG. 2, a wide bandwidth channel 200 has a 320 MHz total bandwidth resulting from the bonding or aggregation of sixteen smaller 20 MHz bandwidth subchannels including a first subchannel 215, a second subchannel 225, a third subchannel 235 and a fourth subchannel 245.

The 320 MHz wide bandwidth channel 200 may be segmented to define primary and secondary channels. For example, the first subchannel 215 may be a primary 20 MHz bandwidth channel and the second subchannel 225 may be a secondary 20 MHz bandwidth channel. Together, the first subchannel 215 and the second subchannel 225 may form a primary 40 MHz bandwidth channel. The third subchannel 235 and the fourth subchannel 245 may be 20 MHz bandwidth channels. Together, the third subchannel 235 and the fourth subchannel 245 may form a secondary 40 MHz bandwidth channel. The secondary 40 MHz bandwidth channel is "secondary" in relation to the primary 40 MHz bandwidth channel formed by the first subchannel 215 and the second subchannel 225. In a similar way, a first set of four subchannels, consisting of all four of the first subchannel 215, the second subchannel 225, the third subchannel 235 and the fourth subchannel 245, may form a primary 80 MHz bandwidth channel and a second set of four different subchannels may form a secondary 80 MHz bandwidth channel. In some implementations, a tertiary 80 MHz bandwidth channel may be defined from a third set of four different subchannels and a quaternary 80 MHz bandwidth channel may be defined from a fourth set of four different subchannels. It is expected that wide bandwidth channels of 80 MHz, 160 MHz, 240 MHz, or 320 MHz total bandwidth may be based on different quantities of 80 MHz portions. Within each 80 MHz portion, different 20 MHz subchannels may be punctured.

Figure 3:
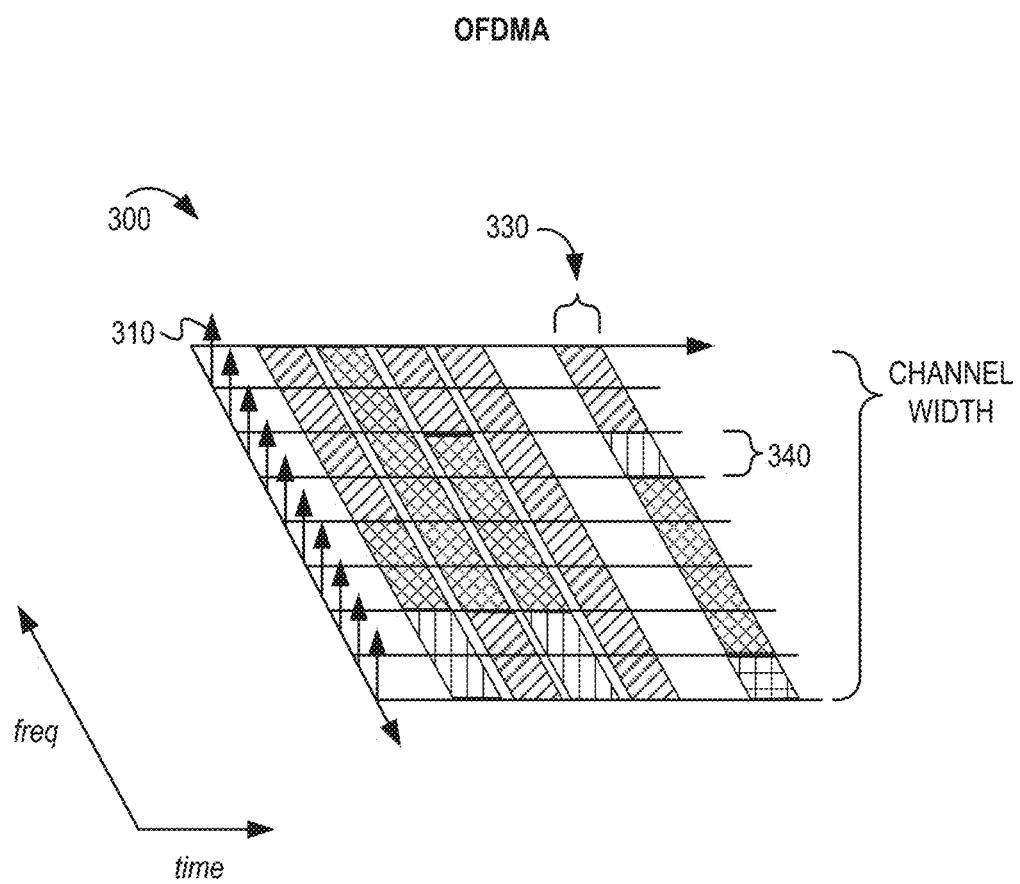
FIG. 3 shows a conceptual diagram illustrating resource assignments within a wireless channel.

FIG. 3 shows a conceptual diagram illustrating resource assignments within a wireless channel. A resource assignment also may be referred to as an RU allocation. A tone plan may define the possible RU sizes and locations for a wireless channel. Each RU may be formed by a set of tones. The tones are conceptually depicted in FIG. 3 as subcarriers, such as a first subcarrier 310. RUs may be allocated in 2 MHz intervals, and as such, the smallest RU includes 26 tones consisting of 24 data tones and 2 pilot tones. As such, in a 20 MHz bandwidth channel, up to 9 RUs (such as 2 MHz, 26-tone RUs) may be allocated (because some tones are reserved for other purposes). Similarly, in a 160 MHz bandwidth channel, up to 74 RUs may be allocated to various STAs. Larger 52-tone, 106-tone, 242-tone, 484-tone, and 996-tone RUs also may be allocated. As described above, adjacent RUs may be separated by one or more null subcarriers (not shown), for example, to reduce interference between adjacent RUs, to reduce receiver DC offset, and to avoid transmit center frequency leakage.

For multi-user OFDMA transmissions, an AP may allocate multiple RUs for respective STAs. The RUs may be allocated for downlink traffic (from an AP to various STAs) or may be allocated for uplink traffic (from various STAs to the AP). As shown in FIG. 3, the different shadings indicate different RUs of PPDU that may be transmitted to (or allocated for the use by) different STAs. For example, a PPDU 330 may include different RUs allocated for a first STA, a second STA, a third STA, and a fourth STA. In one aspect, the PPDU 330 may be a downlink PPDU, and the PPDU 330 may include one RU 340 allocated for a STA to receive data, while other RUs are allocated for other STAs to receive other data. In another aspect, the PPDU 330 may be an uplink PPDU. An AP may send a scheduling PPDU (not shown) prior to the PPDU 330 and indicating which RUs are allocated to the various STAs to transmit their respective uplink data.

Figure 4:
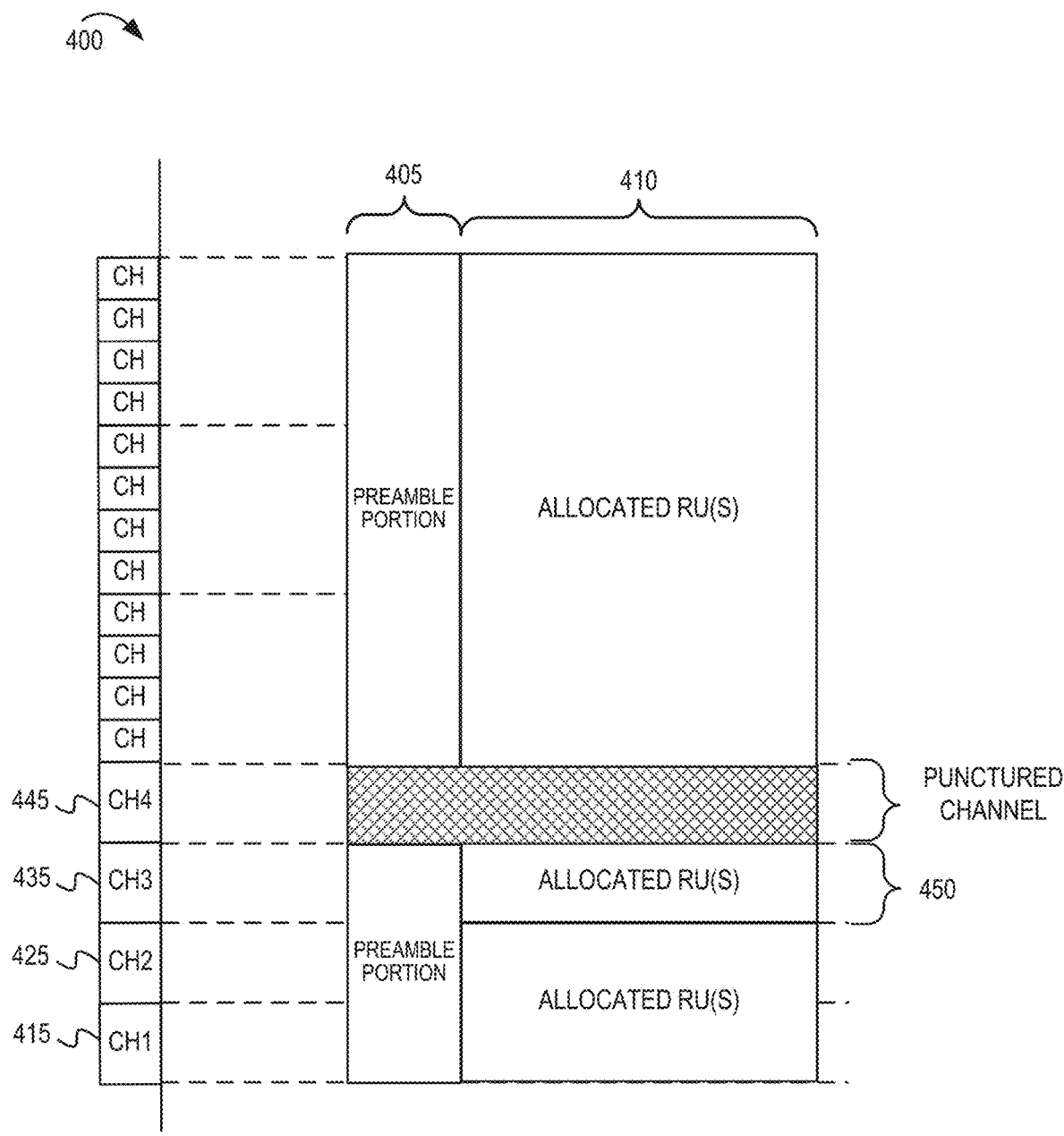
FIG. 4 shows a conceptual diagram illustrating a punctured transmission in a 320 MHz bandwidth channel.

FIG. 4 shows a conceptual diagram illustrating a punctured transmission 400 in a 320 MHz bandwidth channel. Puncturing may be used to enable a WLAN to utilize a larger bandwidth wireless channel by avoiding communicating (or transmitting energy) on tones with one or more subchannels on which incumbent systems are operating. For example, within an 80 MHz channel bandwidth, one or more of the 20 MHz bandwidth subchannels may be punctured to prevent communication on those subchannels. The 320 MHz bandwidth channel may include a primary 80 MHz channel, a secondary 80 MHz channel, a tertiary 80 MHz channel and a quaternary 80 MHz channel, as described with reference to FIG. 2. In FIG. 4, the primary 80 MHz portion is illustrated with its respective 20 MHz subchannels (a first subchannel 415, a second subchannel 425, a third subchannel 435, and a fourth subchannel 445). The secondary 80 MHz channel, the tertiary 80 MHz channel and the quaternary 80 MHz channel illustrated with a smaller scale in FIG. 4 for purposes of conciseness.

In the example scenario depicted in FIG. 4, there may be an incumbent system transmission that occupies all or part of the 20 MHz bandwidth associated with the fourth subchannel 445. Therefore, a wireless communication device (such as an AP or a STA) in the WLAN may puncture a PPDU on the wireless channel to exclude the fourth subchannel 445 from the transmission. The PPDU may include transmitted energy on tones of the first sub channel 415, the second subchannel 425, and the third subchannel 435, as well as the other unpunctured subchannels in the secondary 80 MHz channel, the tertiary 80 MHz channel and the quaternary 80 MHz channel, while not transmitting data on tones within the punctured fourth subchannel 445.

The transmission 400 may include a preamble portion 405 followed by RUs 410 that are allocated to respective STAs. In the illustrated example, the transmission 400 is a downlink OFDMA transmission that includes data for multiple recipient STAs in their respective allocated RUs. In another example, an uplink OFDMA transmission may include uplink data from various STAs in respective RUs allocated by the AP. In some implementations, each 80 MHz portion of the wireless channel may have a different puncturing configuration. Signaling in the preamble portion 405 may indicate which subchannels are punctured (such as the fourth 20 MHz subchannel 445) as well as the RU allocations 410 that are assigned to the different STAs. An AP may allocate a various RUs 450 that are located entirely within the third 20 MHz subchannel 435. However, some RUs according to a legacy tone plan may include tones that are located in both the third 20 MHz subchannel 435 and the fourth 20 MHz subchannel 445. Thus, when limited to the legacy tone plan, the AP may refrain from allocating any RUs that have tones within the 20 MHz bandwidth associated with the punctured fourth 20 MHz subchannel 445 since the use of those RUs may cause interference with other systems using the punctured fourth 20 MHz subchannel 445.

Figure 5:
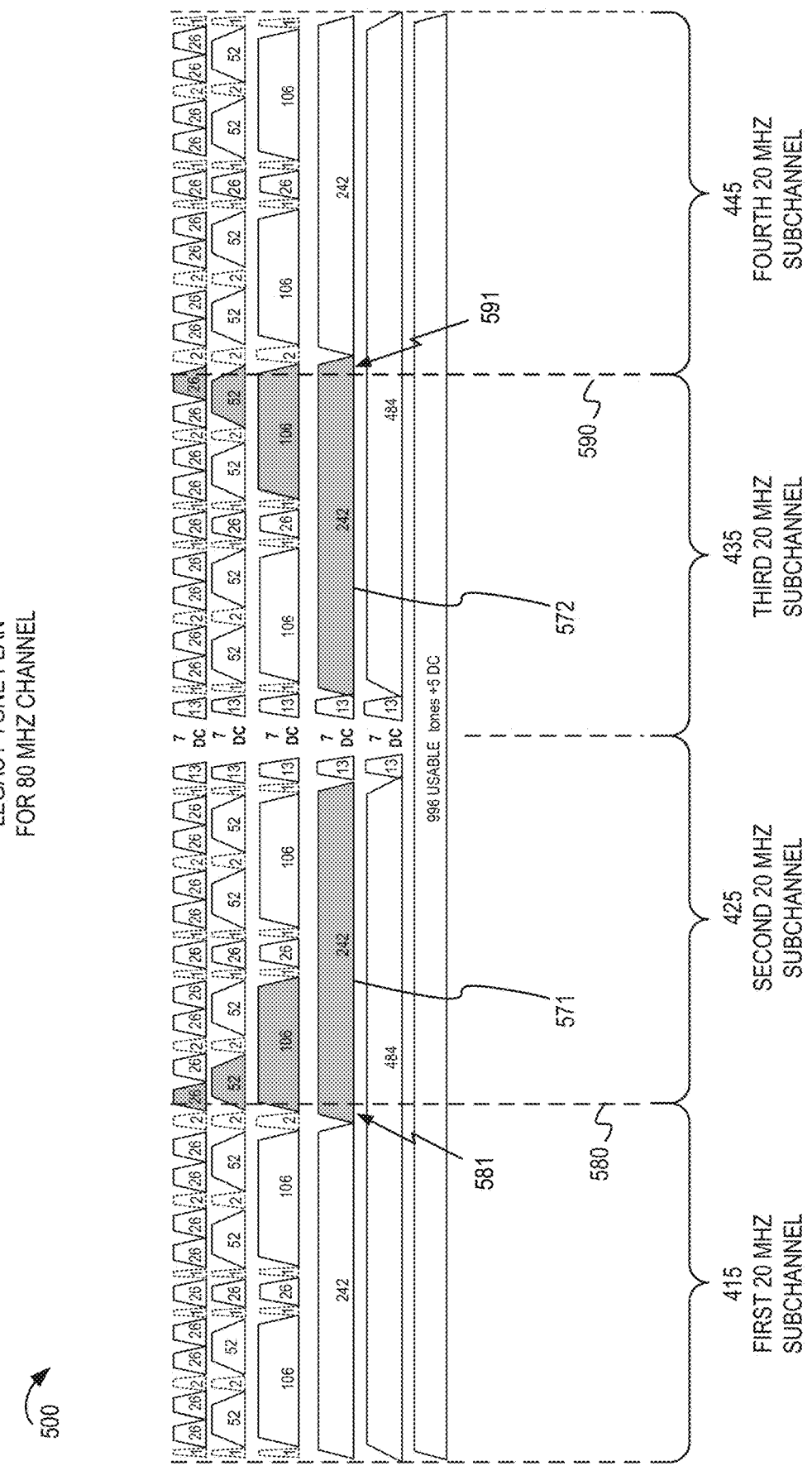
FIG. 5 shows an example legacy tone plan in which some resource units (RUs) overlap subchannel boundaries in an 80 MHz wireless channel.

FIG. 5 shows an example legacy tone plan 500 in which some RUs overlap subchannel boundaries in an 80 MHz wireless channel. The example legacy tone plan 500 is defined for an 80 MHz channel bandwidth that includes four 20 MHz subchannels. As described above, some tone plans (such as the legacy tone plan 500) may define RUs that overlap the boundaries of the 20 MHz bandwidth subchannels. The example legacy tone plan 500 may define edge tones (not shown) and DC tones. FIG. 5 shows each potential RU in the 80 MHz channel as well as some null tones (shown with dotted lines) between the potential RUs.

As described above, the legacy tone plan 500 may define RUs of various sizes. As shown in FIG. 5, a total of 996 usable tones are available when the full 80 MHz bandwidth (BW) is allocated as a single RU. FIG. 5 also shows example 26-tone, 52-tone, 106-tone, 242-tone, and 484-tone RUs that may be available to allocate to different users.

FIG. 5 also shows the physical 20 MHz subchannels and boundaries overlaid on the example legacy tone plan 500 to illustrate some examples where potential RU allocations overlap or cross 20 MHz subchannel boundaries. For example, according to the legacy tone plan 500, the 2nd 242-tone RU 571 includes some tones 581 that located on the other side of a boundary 580 between the first 20 MHz subchannel 415 and the second 20 MHz subchannel 425. Similarly, the 3rd 242-tone RU 572 includes some tones 591 that are located on the other side of a boundary 590 between the third 20 MHz subchannel 435 and the fourth 20 MHz subchannel 445. The 2nd 242-tone RU 571 and the 3rd 242-tone RU 572 are just two examples in which the legacy tone plan 500 defines RUs that cross a 20 MHz subchannel boundary. The RUs that overlap a 20 MHz subchannel boundary are highlighted with grey shading for reference. Other RUs that overlap a subchannel boundary include, for the first 20 MHz subchannel 415, the 10th 26-tone RU, the 5th 52-tone RU, and the 3rd 106-tone RU, and, for the fourth 20 MHz subchannel 445, the 28th 26-tone RU, the 12th 52-tone RU and the 6th 106-tone RU. Each of these RUs may have different numbers of tones that cross the respective 20 MHz boundaries.

FIG. 6A shows the 242-tone RUs 501 from the example legacy tone plan of FIG. 5. There are 2 data tones 581 of the second 242-tone RU 571 that exist across a subchannel boundary 580. Thus, when the first 20 MHz subchannel 415 is punctured, the current options in view of the legacy tone plan would include either not allocating the second 242-tone RU 571 to a user to prevent interference within the first 20 MHz subchannel 415, or allocating the second 242-tone RU 571 and potentially creating interference within the first 20 MHz subchannel 415. Neither of the current options are desirable. Similar to the second 242-tone RU 571, the third 242-tone RU 572 in the legacy tone plan includes three data tones 591 that exist across a subchannel boundary 590. Thus, a similar problem is faced when the fourth 20 MHz subchannel 445 is punctured.

To enable the possibility of puncturing any of the 20 MHz subchannels, this disclosure presents various aspects associated with a new tone plan that defines RUs and their associated tone locations such that no tones of any of the RUs would exist in a punctured subchannel. In some aspects, a legacy tone plan may be modified or adjusted to generate the new tone plan such that the RUs do not overlap the 20 MHz subchannel boundaries. In some examples, the new tone plan is to be defined in a technical specification (such as an amendment to an IEEE 802.11 specification) such that the new tone plan may be used for any and all transmissions that implement the technical specification. In some other examples, the legacy tone plan may be modified or adjusted dynamically when needed based on puncturing. This disclosure provides various techniques for modifying a legacy tone plan such that RUs do not overlap a 20 MHz subchannel boundary while maintaining an equivalent number of data tones for the RU that was present in the legacy tone plan.

FIG. 6B shows an example of tone shifting 601 for 242-tone RUs according to some implementations. The second 242-tone RU is shifted 650 to avoid the subchannel boundary 580. For example, all the tones of the second 242-tone RU may be moved to the right leaving null tones where the second 242-tone RU previously crossed the subchannel boundary 580. The center RU26 (shown as two 13-tone portions in FIG. 5) may be eliminated or reduced to make room for the shifted second 242-tone RU. The tone shifting 601 may be described as the omission of the tones 581 that cross the subchannel boundary 580 and addition of new data tones 612 toward the center of the 80 MHz tone plan. The third 242-tone RU is shifted 660 to the left leaving null tones where the second 242-tone RU previously crossed the subchannel boundary 590. The quantity of tones that are shifted (such as 5 tones) is sufficient to avoid the respective subchannel boundaries when those RUs are allocated to a user. In some implementations, the tone shifting 601 may result in a new tone plan that is used regardless of whether the adjacent subchannel (such as the first 20 MHz subchannel 415 or the fourth 20 MHz subchannel 445) is punctured and regardless of whether the RU (such as the second 242-tone RU or the third 242-tone RU) is allocated.

FIG. 6C shows an example of pilot tone replacement 602 for 242-tone RUs according to some implementations. The edge tones 581 of the second 242-tone RU that previously crossed the subchannel boundary 580 may be omitted from the second 242-tone RU. Each 242-tone RU typically includes 234 data tones and 8 pilot tones (some of which are illustrated as pilot tones 614). The pilot tones are used for phase information, alignment, or signaling, among other examples. In some implementations, a quantity of pilot tones 614 located within the second 242-tone RU may be changed from pilot tones to data tones so that the second 242-tone RU can include a same amount of data previously associated with the second 242-tone RU according to the legacy tone plan. The quantity of pilot tones 614 that are changed to become replacement data tones is sufficient to replace the omitted edge tones 581. For example, 4 edge tones 581 may be omitted and 4 pilot tones 614 may be redefined as data tones. That would leave 4 remaining pilot tones (out of the original 8 pilot tones). In some implementations, the pilot tone replacement technique described with reference to FIG. 6C can be used without eliminating the center 26-tone RU (shown as two 13-tone portions in FIGS. 5, 6A and 6C).

The examples shown and described with reference to FIGS. 6B and 6C are didactic in nature and merely illustrate some of many examples that may be supported by aspects of this disclosure. For example, the concepts described with reference to 242-tone RUs also may be applied to other sizes of RUs, such as the grey-shaded RUs illustrated and described with reference to FIG. 5.

Figure 7:
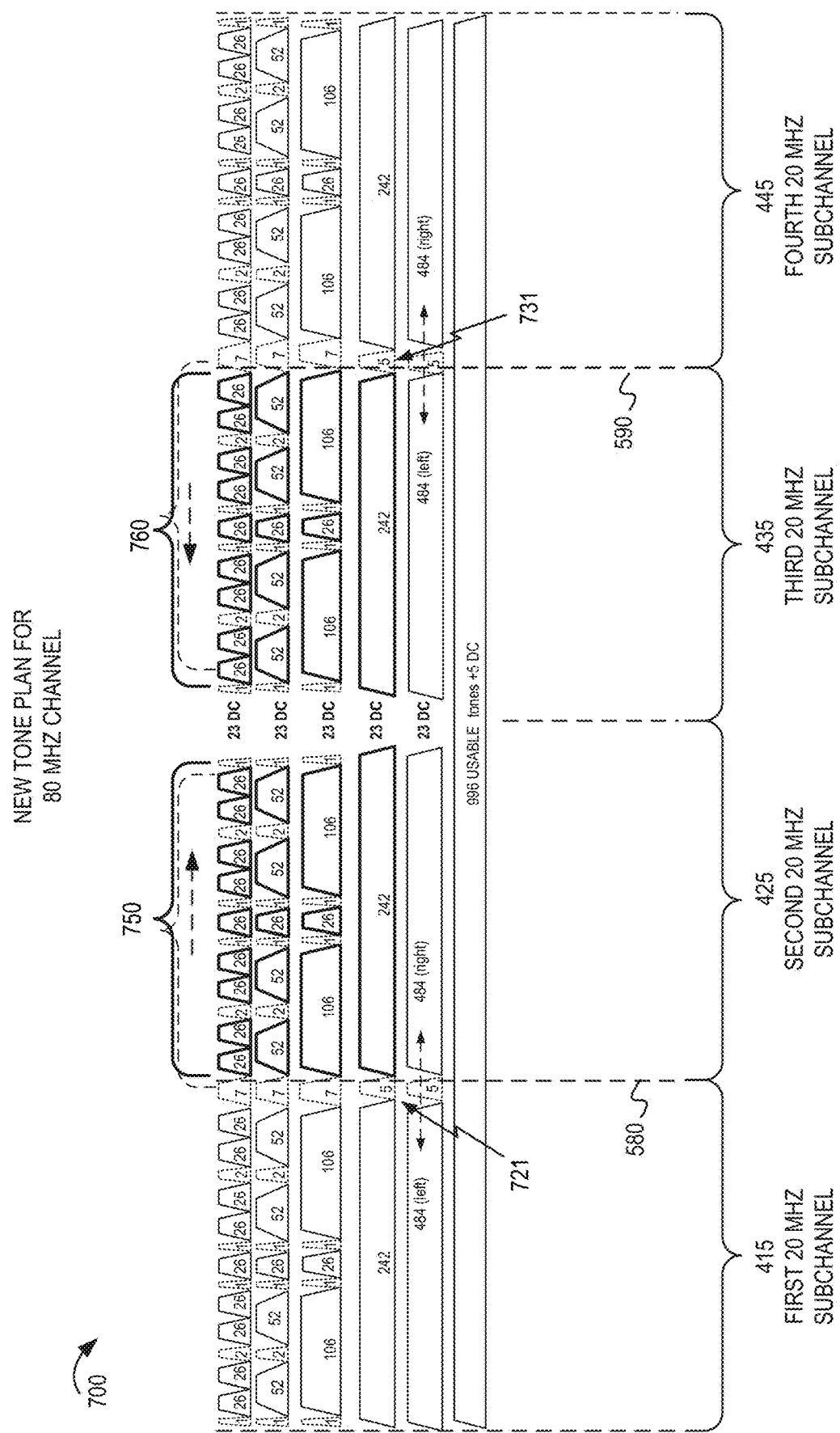
FIG. 7 shows an example new tone plan in which RUs are defined to avoid subchannel boundaries in an 80 MHz wireless channel.

FIG. 7 shows an example new tone plan 700 in which RUs are defined to avoid subchannel boundaries in an 80 MHz wireless channel. In the new tone plan 700, the grey-shaded RUs described with reference to the legacy tone plan 500 of FIG. 5 are shifted 750 to avoid subchannel boundaries. Some RUs are shifted to the right to avoid the subchannel boundary 580 of the first 20 MHz subchannel 415. Some other RUs are shifted to the left to avoid the subchannel boundary 590 of the fourth 20 MHz subchannel 445. The shifted RUs are illustrated with bold lines in FIG. 7.

The center 26-tone RU (shown as two 13-tone portions in FIG. 5) may be eliminated to make room for the shifted RUs. In FIG. 7, the shifted RUs are shifting by 5 tones leaving null tones 721 and tones 731 (shown in dotted lines) at the subchannel boundaries.

In some implementations, as shown in FIG. 7, a 484-tone RU may be split such that half of the 484-tone RU is shifted leaving null tones at or near the 20 MHz subchannel boundary. Half of the first 484-tone RU that overlaps the second 20 MHz subchannel 425 is shifted to the right and 5 null tones are placed at the subchannel boundary. Similarly, half of the second 484-tone RU in the third 20 MHz subchannel 435 are shifted to the left and 5 null tones are placed at the boundary between the third 20 MHz subchannel 435 and the fourth 20 MHz subchannel 445. Both of those 484-tone RUs have the same quantity of tones as corresponding RUs in a legacy tone plan. One reason the 484-tone RUs may be split as shown in FIG. 7 is so that the 484-tone RUs match the locations of tones for the 242-tone RUs.

While the new tone plan 700 describes an 80 MHz wireless channel bandwidth, the same technique may be used to determine new tone plans for wireless channels having greater bandwidth. For example, a new tone plan for 160 MHz, 240 MHz or 320 MHz channels may be based on a replication or expansion of the new tone plan 700. The new tone plan 700 also may be referred to as a non-legacy tone plan to distinguish from a legacy tone plan. The non-legacy tone plan may be specified in IEEE 802.11be (which also may be referred to as Extremely High Throughput (EHT))) and those systems that implement EHT communication. The legacy tone plan may refer to one that is specified in IEEE 802.11ax (or earlier generations of the IEEE 802.11 family of standards).

An RU allocation table may include different values associated with the RUs that an AP can allocate. In some implementations, a first set of values in the RU allocation table may indicate RUs defined is according to a new tone plan. A second set of values in the RU allocation table may indicate RUs defined according to a legacy tone plan. A first value may indicate a 242-tone RU according to the legacy tone plan (such as described with reference to FIG. 7). A second value may indicate the 242-tone RU according to a non-legacy tone plan (such as described with reference to FIG. 7).

Figure 8:
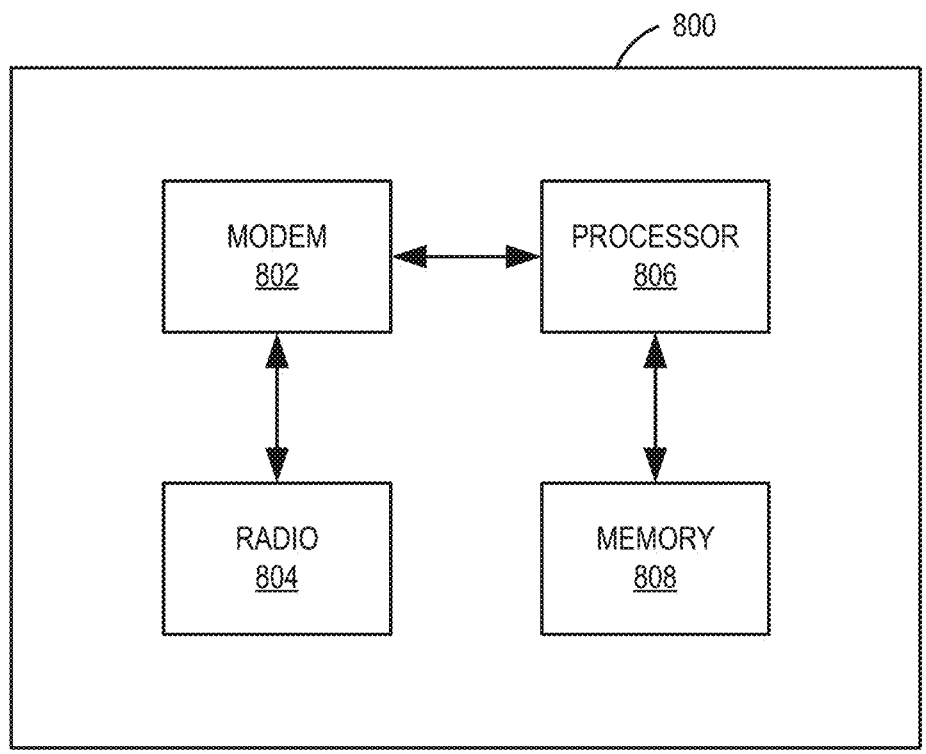
FIG. 8 shows a block diagram of an example wireless communication device.

FIG. 8 shows a block diagram of an example wireless communication device 800. In some implementations, the wireless communication device 800 can be an example of a device for use in a STA such as one of the STAs 104 described above with reference to FIG. 1. In some implementations, the wireless communication device 800 can be an example of a device for use in an AP such as the AP 102 described above with reference to FIG. 1. The wireless communication device 800 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11 ay, 802.11ax, 802.11az, 802.11ba and 802.11be.

The wireless communication device 800 can be, or can include, a chip, system on chip (SoC), chipset, package or device that includes one or more modems 802, for example, a Wi-Fi (IEEE 802.11 compliant) modem. In some implementations, the one or more modems 802 (collectively "the modem 802") additionally include a WWAN modem (for example, a 3GPP 4G LTE or 5G compliant modem). In some implementations, the wireless communication device 800 also includes one or more radios 804 (collectively "the radio 804"). In some implementations, the wireless communication device 800 further includes one or more processors, processing blocks or processing elements 806 (collectively "the processor 806") and one or more memory blocks or elements 808 (collectively "the memory 808").

The modem 802 can include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are then mapped to points in a modulation constellation (using a selected MCS) to provide modulated symbols. The modulated symbols may then be mapped to a number NSS of spatial streams or a number NSTS of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 806) for processing, evaluation or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 800 can include, or be coupled with, multiple transmit antennas (each with a corresponding transmit chain) and multiple receive antennas (each with a corresponding receive chain). The symbols output from the modem 802 are provided to the radio 804, which then transmits the symbols via the coupled antennas. Similarly, symbols received via the antennas are obtained by the radio 804, which then provides the symbols to the modem 802.

The processor 806 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. For example, the processor 806 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 806 may generally control the modem 802 to cause the modem to perform various operations described above.

The memory 808 can include tangible storage media such as random-access memory (RAM) or read-only memory (ROM), or combinations thereof. The memory 808 also can store non-transitory processor- or computer-executable software (SW) code containing instructions that, when executed by the processor 806, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 9B:
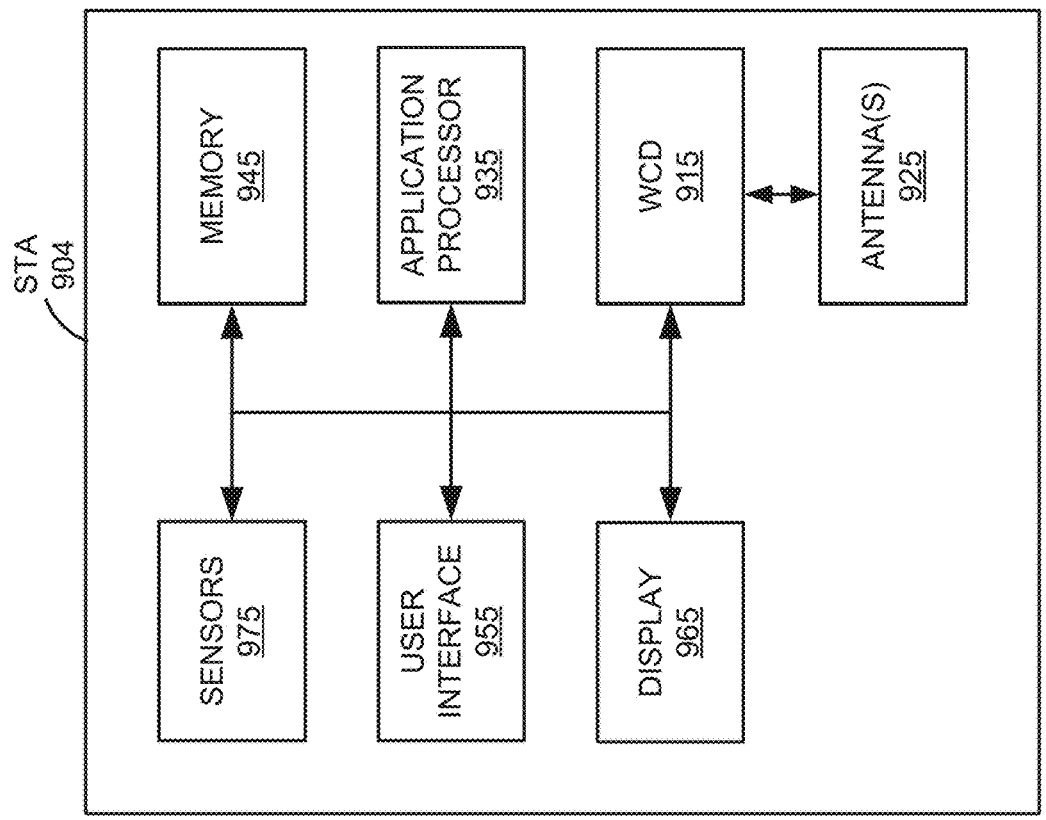
FIG. 9B shows a block diagram of an example STA.
Figure 9A:
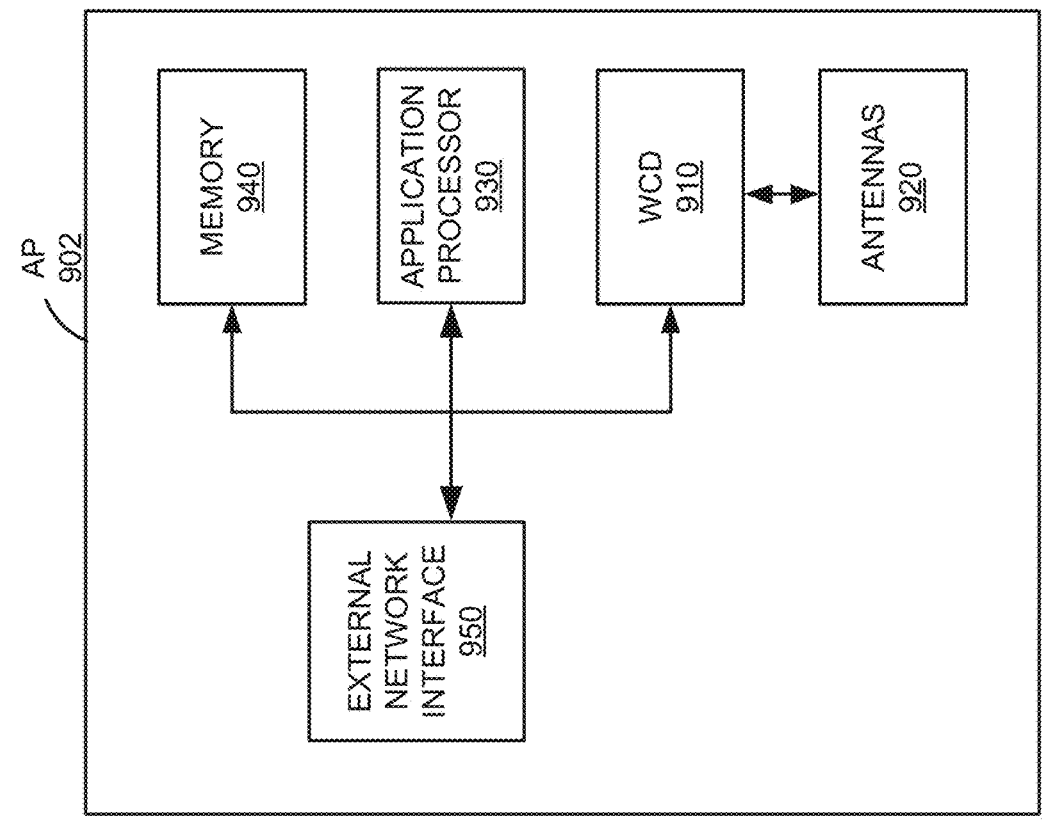
FIG. 9A shows a block diagram of an example AP.

FIG. 9A shows a block diagram of an example AP 902. For example, the AP 902 can be an example implementation of the AP 102 described with reference to FIG. 1. The AP 902 includes a wireless communication device (WCD) 910 (although the AP 902 may itself also be referred to generally as a wireless communication device as used herein). For example, the wireless communication device 910 may be an example implementation of the wireless communication device 8000 described with reference to FIG. 8. The AP 902 also includes multiple antennas 920 coupled with the wireless communication device 910 to transmit and receive wireless communications. In some implementations, the AP 902 additionally includes an application processor 930 coupled with the wireless communication device 910, and a memory 940 coupled with the application processor 930. The AP 902 further includes at least one external network interface 950 that enables the AP 902 to communicate with a core network or backhaul network to gain access to external networks including the Internet. For example, the external network interface 950 may include one or both of a wired (for example, Ethernet) network interface and a wireless network interface (such as a WWAN interface). Ones of the aforementioned components can communicate with other ones of the components directly or indirectly, over at least one bus. The AP 902 further includes a housing that encompasses the wireless communication device 910, the application processor 930, the memory 940, and at least portions of the antennas 920 and external network interface 950.

FIG. 9B shows a block diagram of an example STA 904. For example, the STA 904 can be an example implementation of the STA 104 described with reference to FIG. 1. The STA 904 includes a wireless communication device 915 (although the STA 904 may itself also be referred to generally as a wireless communication device as used herein). For example, the wireless communication device 915 may be an example implementation of the wireless communication device 800 described with reference to FIG. 8. The STA 904 also includes one or more antennas 925 coupled with the wireless communication device 915 to transmit and receive wireless communications. The STA 904 additionally includes an application processor 935 coupled with the wireless communication device 915, and a memory 945 coupled with the application processor 935. In some implementations, the STA 904 further includes a user interface (UI) 955 (such as a touchscreen or keypad) and a display 965, which may be integrated with the UI 955 to form a touchscreen display. In some implementations, the STA 904 may further include one or more sensors 975 such as, for example, one or more inertial sensors, accelerometers, temperature sensors, pressure sensors, or altitude sensors. Ones of the aforementioned components can communicate with other ones of the components directly or indirectly, over at least one bus. The STA 904 further includes a housing that encompasses the wireless communication device 915, the application processor 935, the memory 945, and at least portions of the antennas 925, UI 955, and display 965.

Figure 10:
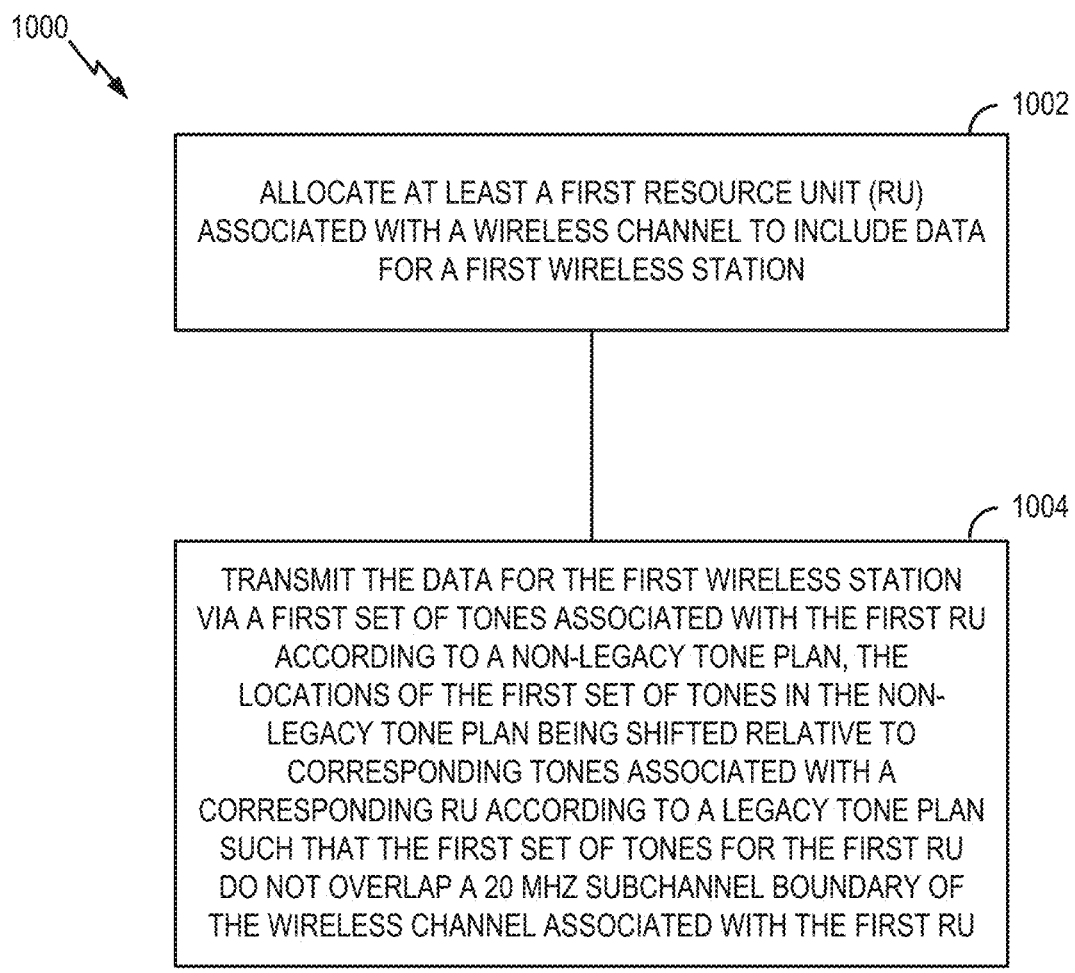
FIG. 10 shows a flowchart illustrating an example process for communicating according to a tone plan that supports punctured transmissions according to some implementations.

FIG. 10 shows a flowchart illustrating an example process 1000 for communicating using an RU allocation according to some implementations. The process 1000 may be performed by a wireless communication device such as the wireless communication device 800 described above with reference to FIG. 8. In some implementations, the process 1000 may be performed by a wireless communication device operating as or within an AP, such as one of the APs 102 and 902 described above with reference to FIGS. 1 and 9A, respectively. In some implementations, the process 1000 may be performed by a wireless communication device operating as or within a STA, such as one of the STAs 104 and 904 described above with reference to FIGS. 1 and 9B, respectively.

In some implementations, the process 1000 begins in block 1002 with allocating at least a first resource unit (RU) associated with a wireless channel to include data for a first wireless station.

In block 1004, the process 1000 proceeds with transmitting the data for the first wireless station via a first set of tones associated with the first RU according to a non-legacy tone plan. The locations of the first set of tones in the non-legacy tone plan may be shifted relative to corresponding tones associated with a corresponding RU according to a legacy tone plan such that the first set of tones for the first RU do not overlap a 20 MHz subchannel boundary of the wireless channel associated with the first RU.

Figure 11:
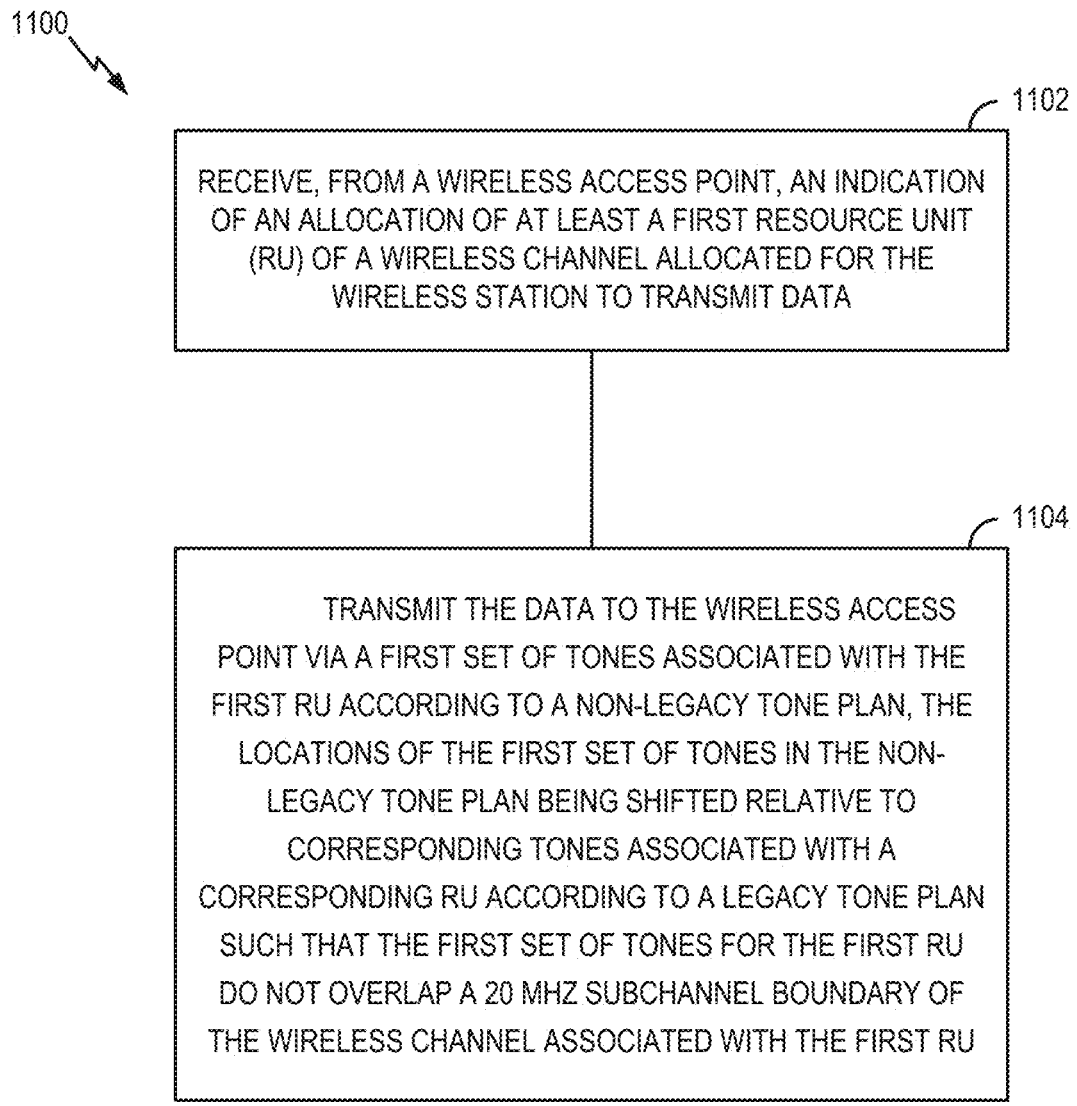
FIG. 11 shows a flowchart illustrating an example process for communicating according to a tone plan that supports punctured transmissions according to some implementations.

FIG. 11 shows a flowchart illustrating an example process 1100 for communicating using a tone plan according to some implementations. The process 1100 may be performed by a wireless communication device such as the wireless communication device 800 described above with reference to FIG. 8. In some implementations, the process 1100 may be performed by a wireless communication device operating as or within an AP, such as one of the APs 102 and 902 described above with reference to FIGS. 1 and 9A, respectively. In some implementations, the process 1100 may be performed by a wireless communication device operating as or within a STA, such as one of the STAs 104 and 904 described above with reference to FIGS. 1 and 9B, respectively.

In some implementations, the process 1100 begins in block 1102 with receiving, from a wireless access point, an indication of an allocation of at least a first resource unit (RU) of a wireless channel allocated for the wireless station to transmit data.

In block 1104, the process 1100 proceeds with transmitting the data to the wireless access point via a first set of tones associated with the first RU according to a non-legacy tone plan. The locations of the first set of tones in the non-legacy tone plan may be shifted relative to corresponding tones associated with a corresponding RU according to a legacy tone plan such that the first set of tones for the first RU do not overlap a 20 MHz subchannel boundary of the wireless channel associated with the first RU.

Figure 12:
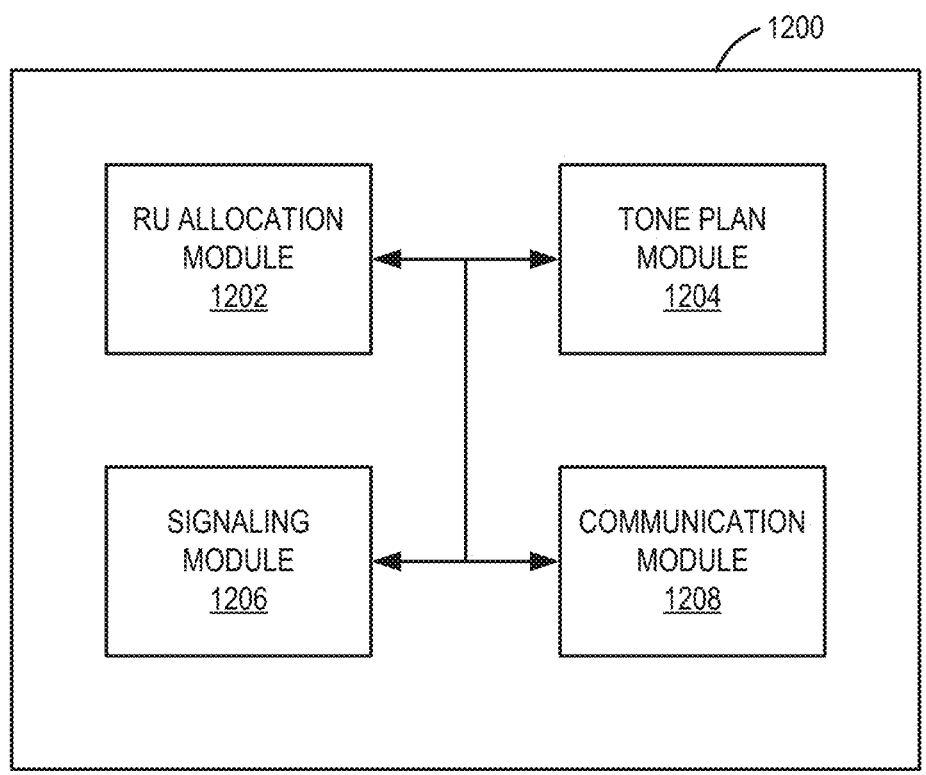
FIG. 12 shows a block diagram of an example wireless communication device capable of communicating according to a tone plan that supports punctured transmissions according to some implementations.

FIG. 12 shows a block diagram of an example wireless communication device 1200 according to some implementations. In some implementations, the wireless communication device 1200 is configured to perform one or more of the processes described above. The wireless communication device 1200 may be an example implementation of the wireless communication device 800 described above with reference to FIG. 8. For example, the wireless communication device 1200 can be a chip, SoC, chipset, package or device that includes at least one processor and at least one modem (for example, a Wi-Fi (IEEE 802.11) modem or a cellular modem). In some implementations, the wireless communication device 1200 can be a device for use in an AP, such as one of the APs 102 and 902 described above with reference to FIGS. 1 and 9A, respectively. In some implementations, the wireless communication device 1200 can be a device for use in a STA, such as one of the STAs 104 and 904 described above with reference to FIGS. 1 and 9B, respectively. In some other implementations, the wireless communication device 1200 can be an AP or a STA that includes such a chip, SoC, chipset, package or device as well as at least one transmitter, at least one receiver, and at least one antenna.

The wireless communication device 1200 includes an RU allocation module 1202, a tone plan module 1204, a signaling module 1206 and a communication module 1208. Portions of one or more of the modules 1202, 1204, 1206 and 1208 may be implemented at least in part in hardware or firmware. For example, the RU allocation module 1202, the tone plan module 1204, the signaling module 1206 and the communication module 1208 may be implemented at least in part by a modem (such as the modem 802). In some implementations, portions of some of the modules 1202, 1204, 1206 or 1208 may be implemented at least in part as software stored in a memory (such as the memory 808). For example, portions of one or more of the modules 1202, 1204, 1206 or 1208 can be implemented as non-transitory instructions (or "code") executable by a processor (such as the processor 806) to perform the functions or operations of the respective module.

The RU allocation module 1202 is configured to allocate RUs associated with a wireless channel.

The tone plan module 1204 is configured to implement a new tone plan (such as the new tone plan 700 described with reference to FIG. 7). The tone plan module 1204 may define the data tones to send or receive data based on an RU allocation.

The signaling module 1206 is configured to interpret signal fields to determine the RU allocation, punctured channel information, or both. For example, the signaling module 1206 may interpret a preamble portion of an OFDMA PPDU to determine the RU allocated to the wireless communication device 1200.

The communication module 1208 is configured to communicate data via a set of tones associated with an RU allocated to the wireless communication device 1200.

FIG. 13 shows example RU definitions 1300 in terms of tone indices according to some implementations. The example RU definitions 1300 are based on the new tone plan 700 for an 80 MHz EHT PPDU as described with reference to FIG. 7. The notation [x:y] indicates the RU includes tone x through tone y. The notation [x1:y1, x2:y2] indicate the RU includes tone x 1 through tone y 1 and tone x2 through tone y2. A 242-tone RU (shown at 1310, referred to as RU 2) may include 242 tones from tone −253 to tone −12. The RU 2 in FIG. 13 may correspond to the 2nd 242-tone RU in FIG. 6B and FIG. 7. The 20 MHz subchannel boundary between a first 20 MHz subchannel and a second 20 MHz subchannel is between tone −257 and tone −256. The tone −257 is the last tone in the first 20 MHz subchannel and the −256 tone is the first tone in the second 20 MHz subchannel. RU 2 has been shifted by 5 tones compared to the legacy tone plan 500 described with reference to FIG. 5 but still includes a set of 242 tones that is equivalent in quantity to the corresponding RU in the legacy tone plan 500. For reference, the RUs that have been modified (as compared to a legacy tone plan) are indicated with grey shaded boxes.

FIGS. 1-13 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options (identified as clauses for reference).

Clauses

Clause 1. A method for wireless communication by a wireless access point, including allocating at least a first resource unit (RU) associated with a wireless channel to include data for a first wireless station, and transmitting the data for the first wireless station via a first set of tones associated with the first RU according to a non-legacy tone plan, the locations of the first set of tones in the non-legacy tone plan being shifted relative to corresponding tones associated with a corresponding RU according to a legacy tone plan such that the first set of tones for the first RU do not overlap a 20 MHz subchannel boundary of the wireless channel associated with the first RU.

Clause 2. The method of clause 1, further including allocating one or more additional RUs to include other data for one or more respective other wireless stations, and transmitting the other data for the one or more respective other wireless stations in respective sets of tones corresponding to the one or more additional RUs.

Clause 3. The method of clause 1, where the first RU according to the non-legacy tone plan has a same quantity of tones as the corresponding RU according to the legacy tone plan.

Clause 4. The method of clause 1, where the non-legacy tone plan defines sets of tones corresponding to a plurality of RUs such that the plurality of RUs do not overlap 20 MHz subchannel boundaries within the wireless channel.

Clause 5. The method of clause 4, where at least one of the plurality of RUs according to the non-legacy tone plan is based on pilot tone replacement in which one or more pilot tones are designated as data tones.

Clause 6. The method of clause 1, where the wireless channel includes at least one 80 MHz bandwidth portion including a first 20 MHz bandwidth subchannel, a second 20 MHz bandwidth subchannel, a third 20 MHz bandwidth subchannel and a fourth 20 MHz bandwidth subchannel, and where the non-legacy tone plan differs from the legacy tone plan by a tone shift for all 26-tone, 52-tone, 106-tone and 242-tone RUs in the second and third 20 MHz bandwidth subchannels such that those RUs do not overlap the 20 MHz subchannel boundaries.

Clause 7. The method of clause 6, further including allocating all RUs in the second and third 20 MHz bandwidth subchannels regardless of puncturing of the first 20 MHz bandwidth subchannel, the fourth 20 MHz bandwidth subchannel, or both.

Clause 8. The method of clause 1, where the first RU is a 26-tone, 52-tone, 106-tone, or 242-tone RU at an edge of a first 20 MHz bandwidth subchannel of the wireless channel.

Clause 9. The method of clause 8, further including puncturing a second 20 MHz bandwidth subchannel of the wireless channel, the second 20 MHz bandwidth subchannel being adjacent to the first 20 MHz bandwidth subchannel.

Clause 10. A method for wireless communication by a wireless station, including: receiving, from a wireless access point, an indication of an allocation of at least a first resource unit (RU) of a wireless channel allocated for the wireless station to transmit data; and transmitting the data to the wireless access point via a first set of tones associated with the first RU according to a non-legacy tone plan, the locations of the first set of tones in the non-legacy tone plan being shifted relative to corresponding tones associated with a corresponding RU according to a legacy tone plan such that the first set of tones for the first RU do not overlap a 20 MHz subchannel boundary of the wireless channel associated with the first RU.

Clause 11. The method of clause 10, where the first RU according to the non-legacy tone plan has a same quantity of tones as the corresponding RU according to the legacy tone plan.

Clause 12. The method of clause 10, where the non-legacy tone plan defines sets of tones corresponding to a plurality of RUs such that the plurality of RUs do not overlap 20 MHz subchannel boundaries within the wireless channel.

Clause 13. The method of clause 10, where the wireless channel includes at least one 80 MHz bandwidth portion including a first 20 MHz bandwidth subchannel, a second 20 MHz bandwidth subchannel, a third 20 MHz bandwidth subchannel and a fourth 20 MHz bandwidth subchannel, and where the non-legacy tone plan differs from the legacy tone plan by a tone shift for all 26-tone, 52-tone, 106-tone and 242-tone RUs in the second and third 20 MHz bandwidth subchannels such that those RUs do not overlap the 20 MHz subchannel boundaries.

Clause 14. The method of clause 10, where the first RU is a 26-tone, 52-tone, 106-tone, or 242-tone RU at an edge of a first 20 MHz bandwidth subchannel of the wireless channel, and where a second 20 MHz bandwidth subchannel, adjacent to the first 20 MHz bandwidth subchannel, is punctured.

Clause 15. A wireless access point including: at least one processor configured to allocate at least a first resource unit (RU) of a wireless channel to include data for a first wireless station; and at least one modem configured to output the data for transmission to the first wireless station in a first set of tones associated with the first RU according to a non-legacy tone plan, the locations of the first set of tones in the non-legacy tone plan being shifted relative to corresponding tones associated with a corresponding RU according to a legacy tone plan such that the first set of tones for the first RU do not overlap a 20 MHz subchannel boundary of the wireless channel associated with the first RU.

Clause 16. The wireless access point of clause 15, where the at least one processor is further configured to allocate one or more additional RUs to include other data for one or more respective other wireless stations; and where the at least one modem is further configured to output the other data for transmission to the one or more respective other wireless stations in respective sets of tones corresponding to the one or more additional RUs. where the non-legacy tone plan defines sets of tones corresponding to a plurality of RUs such that the plurality of RUs do not overlap 20 MHz subchannel boundaries within the wireless channel.

Clause 17. The wireless access point of clause 15, where the first RU according to the non-legacy tone plan has a same quantity of tones as the corresponding RU according to the legacy tone plan.

Clause 18. The wireless access point of clause 15, where the non-legacy tone plan defines sets of tones corresponding to a plurality of RUs such that the plurality of RUs do not overlap 20 MHz subchannel boundaries within the wireless channel.

Clause 19. The wireless access point of clause 18, where the non-legacy tone plan defines sets of tones corresponding to a plurality of RUs such that the plurality of RUs do not overlap 20 MHz subchannel boundaries within the wireless channel.

Clause 20. The wireless access point of clause 15, where the wireless channel includes at least one 80 MHz bandwidth portion including a first 20 MHz bandwidth subchannel, a second 20 MHz bandwidth subchannel, a third 20 MHz bandwidth subchannel and a fourth 20 MHz bandwidth subchannel, and where the non-legacy tone plan differs from the legacy tone plan by a tone shift for all RUs in the second and third 20 MHz bandwidth subchannels to prevent those RUs from overlapping the 20 MHz subchannel boundaries.

Clause 21. The wireless access point of clause 20, where the at least one processor is further configured to allocate all RUs in the second and third 20 MHz bandwidth subchannels regardless of puncturing of the first 20 MHz bandwidth subchannel, the fourth 20 MHz bandwidth subchannel, or both.

Clause 22. The wireless access point of clause 15, where the first RU is a 26-tone, 52-tone, 106-tone, or 242-tone RU at an edge of a 20 MHz bandwidth subchannel of the wireless channel.

Clause 23. The wireless access point of clause 22, where the at least one modem is further configured to puncture a second 20 MHz bandwidth subchannel of the wireless channel, the second 20 MHz bandwidth subchannel being adjacent to the first 20 MHz bandwidth subchannel.

Clause 24. The wireless access point of clause 15, further including: at least one transceiver coupled to the at least one modem; at least one antenna coupled to the at least one transceiver to wirelessly transmit signals output from the at least one transceiver and to wirelessly receive signals for input into the at least one transceiver; and a housing that encompasses the at least one modem, the at least one processor, the at least one transceiver and at least a portion of the at least one antenna.

Clause 25. A wireless station including: at least one processor; and at least one modem communicatively coupled with the at least one processor and configured to: obtain, from a wireless access point, an indication of an allocation of at least a first resource unit (RU) of a wireless channel allocated for the wireless station to transmit data, and output the data to the wireless access point via a first set of tones associated with the first RU according to a non-legacy tone plan, the locations of the first set of tones in the non-legacy tone plan being shifted relative to corresponding tones associated with a corresponding RU according to a legacy tone plan such that the first set of tones for the first RU do not overlap a 20 MHz subchannel boundary of the wireless channel associated with the first RU.

Clause 26. The wireless station of clause 25, where the first RU according to the non-legacy tone plan has a same quantity of tones as the corresponding RU according to the legacy tone plan.

Clause 27. The wireless station of clause 25, where the non-legacy tone plan defines sets of tones corresponding to a plurality of RUs such that the plurality of RUs do not overlap 20 MHz subchannel boundaries within the wireless channel.

Clause 28. The wireless station of clause 25, where the wireless channel includes at least one 80 MHz bandwidth portion including a first 20 MHz bandwidth subchannel, a second 20 MHz bandwidth subchannel, a third 20 MHz bandwidth subchannel and a fourth 20 MHz bandwidth subchannel, and where the non-legacy tone plan differs from the legacy tone plan by a tone shift for all 26-tone, 52-tone, 106-tone and 242-tone RUs in the second and third 20 MHz bandwidth subchannels such that those RUs do not overlap the 20 MHz subchannel boundaries.

Clause 29. The wireless station of clause 25, where the first RU is a 26-tone, 52-tone, 106-tone, or 242-tone RU at an edge of a first 20 MHz bandwidth subchannel of the wireless channel, and where a second 20 MHz bandwidth subchannel, adjacent to the first 20 MHz bandwidth subchannel, is punctured.

Clause 30. The wireless station of clause 25, further including: at least one transceiver coupled to the at least one modem; at least one antenna coupled to the at least one transceiver to wirelessly transmit signals output from the at least one transceiver and to wirelessly receive signals for input into the at least one transceiver; and a housing that encompasses at least the at least one processor, the at least one modem, the at least one transceiver, and at least a portion of the at least one antenna.

Clause 31. A method for wireless communication by a wireless communication device including: receiving a resource unit (RU) allocation for the wireless communication device to communicate via a wireless channel that includes at least one punctured subchannel and at least one non-punctured subchannel; determining data tones for RUs for the at least one non-punctured subchannel based on the RU allocation such that none of the data tones for the RUs are located within the at least one punctured subchannel; and communicating via the determined data tones.

Clause 32. The method of clause 31, where determining the data tones includes determining the data tones based on a first tone plan that defines tones for at least the RU allocation, and where the first tone plan is different from a legacy tone plan that defines tones for a legacy RU allocation having tones that are located within the at least one punctured subchannel.

Clause 33. The method of clause 32, where the first tone plan defines the data tones for the RUs based on shifting corresponding data tones of RUs in the legacy tone plan away from the subchannel boundary of the at least one punctured subchannel.

Clause 34. The method of any one of clauses 32-33, further including determining the data tones for the RUs in the first tone plan based on puncturing a subset of legacy data tones from the legacy tone plan such that none of the data tones for the RUs are located within the at least one punctured subchannel.

Clause 35. The method of clause 34, where determining the data tones includes: identifying one or more pilot tones defined in the legacy tone plan for the at least one non-punctured subchannel; and reallocating the one or more pilot tones as data tones.

Clause 36. The method of any one of clauses 32-35, where the wireless channel includes at least one 80 MHz bandwidth portion including four 20 MHz bandwidth subchannels, and where the first tone plan differs from the legacy tone plan for at least the middle two 20 MHz bandwidth subchannels.

Clause 37. The method of clause 36, further including: using the first tone plan rather than the legacy tone plan to determine the data tones when at least one of an outer 20 MHz bandwidth subchannel within an 80 MHz bandwidth portion of the wireless channel is punctured.

Clause 38. The method of any one of clauses 32-37, where determining the data tones includes: determining that the RU allocation is for a legacy RU in a legacy tone plan and that the legacy RU is adjacent to the at least one punctured subchannel of the wireless channel; and determining the data tones for the RU allocation using the first tone plan rather than the legacy tone plan based on a determination that the at least one punctured subchannel of the wireless channel is punctured.

Clause 39. The method of clause 38, further including determining that the RU allocation is adjacent to the at least one punctured subchannel based on a first RU allocation value in a signaling field of a physical layer convergence protocol (PLCP) protocol data unit (PPDU), where the first RU allocation value is used for the RU allocation when an adjacent subchannel is punctured, and where the first RU allocation value is different from a second RU allocation value used for the same RU allocation when the adjacent subchannel is not punctured.

Clause 40. The method of clause 38, further including determining the at least one punctured subchannel is punctured based on punctured channel information in a signaling field of a physical layer convergence protocol (PLCP) protocol data unit (PPDU) that also includes the RU allocation.

Clause 41. The method of clause 40, where the punctured channel information and the RU allocation are included in a signaling field of the preamble in a first 80 MHz bandwidth portion of the wireless channel.

Clause 42. The method of clause 41, where the signaling field of the PPDU indicates the RU allocation for at least the first 80 MHz bandwidth portion of the wireless channel and where the subchannel puncturing information indicates a subchannel puncturing pattern for a total bandwidth of the wireless channel.

Clause 43. The method of any one of clauses 31-42, where a total bandwidth of the wireless channel is 320 MHz bandwidth, and a bandwidth associated with the RU allocation is between 20 MHz and 60 MHz.

Clause 44. The method of any one of clauses 31-43, where the RU allocation is for a 26-tone, 52-tone, 106-tone, or 242-tone RU and where a legacy tone plan for that size RU includes data tones within a punctured subchannel.

Clause 45. The method of any one of clauses 31-43, where the RU allocation is for a 484-tone RU that is good for a long training field (LTF) signal transmission or channel estimation.

Clause 46. A method for wireless communication including: determining a tone plan that defines resource units (RUs) within a wireless channel such that different ones of the RUs can be allocated to different wireless communication devices for a transmission; determining data tones for the RUs such that none of the data tones for 242-tone RUs and smaller are located within more than one 20 MHz subchannel of the wireless channel; and allocating at least one RU allocation to a wireless communication device for that wireless communication device to communicate via the transmission.

Clause 47. The method of clause 46, where the tone plan is used for the transmission regardless of subchannel puncturing.

Clause 48. The method of clause 46, where the tone plan is used for the transmission when at least one 20 MHz subchannel of the wireless channel is punctured.

Clause 49. The method of clause 46, where the tone plan is used for the transmission when at least one of a first 20 MHz bandwidth subchannel and a fourth 20 MHz bandwidth subchannel within an 80 MHz bandwidth portion of the wireless channel is punctured.

Clause 50. A method for wireless communication by a wireless communication device, the method including: generating a packet that includes an RU allocation described in any one of clauses 31-49; modulating the packet; and transmitting the modulated packet for transmission to at least one wireless communication device.

Another innovative aspect of the subject matter described in this disclosure can be implemented in the wireless communication device having at least one memory communicatively coupled with the at least one processor and storing processor-readable code that, when executed by the at least one processor, causes the wireless communication device to implement any one of the above referenced methods.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless access point, comprising:
   allocating at least a first resource unit (RU) of a plurality of RUs associated with a wireless channel to include data for a first wireless station, the wireless channel including at least one 80 MHz bandwidth portion comprising a first 20 MHz bandwidth subchannel, a second 20 MHz bandwidth subchannel, a third 20 MHz bandwidth subchannel, and a fourth 20 MHz bandwidth subchannel; and
   transmitting the data for the first wireless station via a first set of tones associated with the first RU according to a non-legacy tone plan, locations of the first set of tones in the non-legacy tone plan being shifted relative to corresponding tones associated with a corresponding RU according to a legacy tone plan such that the first set of tones associated with the first RU do not overlap a first subchannel boundary between the first 20 MHz bandwidth subchannel and the second 20 MHz bandwidth subchannel within the wireless channel, and each RU of the plurality of RUs that is within the third 20 MHz bandwidth subchannel does not overlap a second subchannel boundary between the third 20 MHz bandwidth subchannel and the fourth 20 MHz bandwidth subchannel, wherein the first set of tones associated with the first RU according to the non-legacy tone plan has a same quantity of tones as the corresponding tones associated with the corresponding RU according to the legacy tone plan.

2. The method of claim 1, further comprising:
   allocating one or more additional RUs of the plurality of RUs to include other data for one or more respective other wireless stations; and
   transmitting the other data for the one or more respective other wireless stations via respective sets of tones associated with the one or more additional RUs of the plurality of RUs.

3. The method of claim 1, wherein the non-legacy tone plan defines sets of tones associated with the plurality of RUs such that the plurality of RUs do not overlap subchannel boundaries within the wireless channel.

4. The method of claim 3, wherein at least one of the plurality of RUs according to the non-legacy tone plan is based at least in part on pilot tone replacement in which one or more pilot tones are designated as data tones.

5. The method of claim 1, wherein the non-legacy tone plan differs from the legacy tone plan by a tone shift for all 26-tone, 52-tone, 106-tone and 242-tone RUs in the second and third 20 MHz bandwidth subchannels such that all 26-tone, 52-tone, 106-tone and 242-tone RUs in the second and third 20 MHz bandwidth subchannels do not overlap subchannel boundaries within the wireless channel.

6. The method of claim 5, further comprising:
allocating all RUs in the second and third 20 MHz bandwidth subchannels regardless of puncturing of the first 20 MHz bandwidth subchannel, the fourth 20 MHz bandwidth sub channel, or both.

7. The method of claim 1, wherein the first RU is a 26-tone, 52-tone, 106-tone, or 242-tone RU at an edge of the first 20 MHz bandwidth subchannel of the wireless channel.

8. The method of claim 7, further comprising:
puncturing the second 20 MHz bandwidth subchannel of the wireless channel, the second 20 MHz bandwidth subchannel being adjacent to the first 20 MHz bandwidth subchannel.

9. A method for wireless communication by a wireless station, comprising:
receiving, from a wireless access point, an indication of an allocation of at least a first resource unit (RU) of a plurality of RUs associated with a wireless channel allocated for the wireless station to transmit data, the wireless channel including at least one 80 MHz bandwidth portion comprising a first 20 MHz bandwidth subchannel, a second 20 MHz bandwidth subchannel, a third 20 MHz bandwidth subchannel, and a fourth 20 MHz bandwidth subchannel; and
transmitting the data to the wireless access point via a first set of tones associated with the first RU according to a non-legacy tone plan, locations of the first set of tones in the non-legacy tone plan being shifted relative to corresponding tones associated with a corresponding RU according to a legacy tone plan such that the first set of tones associated with the first RU do not overlap a first subchannel boundary between the first 20 MHz bandwidth subchannel and the second 20 MHz bandwidth subchannel within the wireless channel, and each RU of the plurality of RUs that is within the third 20 MHz bandwidth subchannel does not overlap a second subchannel boundary between the third 20 MHz bandwidth subchannel and the fourth 20 MHz bandwidth subchannel, wherein the first set of tones associated with the first RU according to the non-legacy tone plan has a same quantity of tones as the corresponding tones associated with the corresponding RU according to the legacy tone plan.

10. The method of claim 9, wherein the non-legacy tone plan defines sets of tones associated with the plurality of RUs such that the plurality of RUs do not overlap subchannel boundaries within the wireless channel.

11. The method of claim 10, wherein at least one of the plurality of RUs according to the non-legacy tone plan is based at least in part on pilot tone replacement in which one or more pilot tones are designated as data tones.

12. The method of claim 9, wherein the non-legacy tone plan differs from the legacy tone plan by a tone shift for all 26-tone, 52-tone, 106-tone and 242-tone RUs in the second and third 20 MHz bandwidth subchannels such that all 26-tone, 52-tone, 106-tone and 242-tone RUs in the second and third 20 MHz bandwidth subchannels do not overlap subchannel boundaries within the wireless channel.

13. The method of claim 12, wherein the indication of the allocation comprises an indication of an allocation of all RUs in the second and third 20 MHz bandwidth subchannels regardless of puncturing of the first 20 MHz bandwidth subchannel, the fourth 20 MHz bandwidth subchannel, or both.

14. The method of claim 9, wherein the first RU is a 26-tone, 52-tone, 106-tone, or 242-tone RU at an edge of the first 20 MHz bandwidth subchannel of the wireless channel, and wherein the second 20 MHz bandwidth subchannel adjacent to the first 20 MHz bandwidth subchannel is punctured.

15. A wireless access point comprising:
at least one processor configured to allocate at least a first resource unit (RU) of a plurality of RUs associated with a wireless channel to include data for a first wireless station, the wireless channel including at least one 80 MHz bandwidth portion comprising a first 20 MHz bandwidth subchannel, a second 20 MHz bandwidth subchannel, a third 20 MHz bandwidth subchannel, and a fourth 20 MHz bandwidth subchannel; and
at least one modem configured to output the data for transmission to the first wireless station in a first set of tones associated with the first RU according to a non-legacy tone plan, locations of the first set of tones in the non-legacy tone plan being shifted relative to corresponding tones associated with a corresponding RU according to a legacy tone plan such that the first set of tones associated with the first RU do not overlap a first subchannel boundary between the first 20 MHz bandwidth subchannel and the second 20 MHz bandwidth subchannel within the wireless channel, and each RU of the plurality of RUs that is within the third 20 MHz bandwidth subchannel does not overlap a second subchannel boundary between the third 20 MHz bandwidth subchannel and the fourth 20 MHz bandwidth subchannel, wherein the first set of tones associated with the first RU according to the non-legacy tone plan has a same quantity of tones as the corresponding tones associated with the corresponding RU according to the legacy tone plan.

16. The wireless access point of claim 15, wherein:
the at least one processor is further configured to allocate one or more additional RUs of the plurality of RUs to include other data for one or more respective other wireless stations; and
the at least one modem is further configured to output the other data for transmission to the one or more respective other wireless stations via respective sets of tones associated with the one or more additional RUs of the plurality of RUs.

17. The wireless access point of claim 15, wherein the non-legacy tone plan defines sets of tones associated with the plurality of RUs such that the plurality of RUs do not overlap subchannel boundaries within the wireless channel.

18. The wireless access point of claim 17, wherein at least one of the plurality of RUs according to the non-legacy tone plan is based at least in part on pilot tone replacement in which one or more pilot tones are designated as data tones.

19. The wireless access point of claim 15, wherein the non-legacy tone plan differs from the legacy tone plan by a tone shift for all 26-tone, 52-tone, 106-tone and 242-tone RUs in the second and third 20 MHz bandwidth subchannels such that all 26-tone, 52-tone, 106-tone and 242-tone RUs in the second and third 20 MHz bandwidth subchannels do not overlap subchannel boundaries within the wireless channel.

20. The wireless access point of claim 19, wherein the at least one processor is further configured to allocate all RUs in the second and third 20 MHz bandwidth subchannels regardless of puncturing of the first 20 MHz bandwidth subchannel, the fourth 20 MHz bandwidth subchannel, or both.

21. The wireless access point of claim 15, wherein the first RU is a 26-tone, 52-tone, 106-tone, or 242-tone RU at an edge of a 20 MHz bandwidth subchannel of the wireless channel.

22. The wireless access point of claim 21, wherein the at least one modem is further configured to puncture the second 20 MHz bandwidth subchannel of the wireless channel, the second 20 MHz bandwidth subchannel being adjacent to the first 20 MHz bandwidth subchannel.

23. The wireless access point of claim 15, further comprising:
at least one transceiver coupled to the at least one modem;
at least one antenna coupled to the at least one transceiver to wirelessly transmit signals output from the at least one transceiver and to wirelessly receive signals for input into the at least one transceiver; and
a housing that encompasses at least the at least one processor, the at least one modem, the at least one transceiver, and at least a portion of the at least one antenna.

24. A wireless station comprising:
at least one processor; and
at least one modem communicatively coupled with the at least one processor and configured to:
obtain, from a wireless access point, an indication of an allocation of at least a first resource unit (RU) of a plurality of RUs associated with a wireless channel allocated for the wireless station to transmit data, the wireless channel including at least one 80 MHz bandwidth portion comprising a first 20 MHz bandwidth subchannel, a second 20 MHz bandwidth subchannel, a third 20 MHz bandwidth subchannel, and a fourth 20 MHz bandwidth subchannel; and
output the data to the wireless access point via a first set of tones associated with the first RU according to a non-legacy tone plan, locations of the first set of tones in the non-legacy tone plan being shifted relative to corresponding tones associated with a corresponding RU according to a legacy tone plan such that the first set of tones associated with the first RU do not overlap a first subchannel boundary between the first 20 MHz bandwidth subchannel and the second 20 MHz bandwidth subchannel within the wireless channel, and each RU of the plurality of RUs that is within the third 20 MHz bandwidth subchannel does not overlap a second subchannel boundary between the third 20 MHz bandwidth subchannel and the fourth 20 MHz bandwidth subchannel, wherein the first set of tones associated with the first RU according to the non-legacy tone plan has a same quantity of tones as the corresponding tones associated with the corresponding RU according to the legacy tone plan.

25. The wireless station of claim 24, wherein the non-legacy tone plan defines sets of tones associated with the plurality of RUs such that the plurality of RUs do not overlap subchannel boundaries within the wireless channel.

26. The wireless station of claim 25, wherein at least one of the plurality of RUs according to the non-legacy tone plan is based at least in part on pilot tone replacement in which one or more pilot tones are designated as data tones.

27. The wireless station of claim 24, wherein the non-legacy tone plan differs from the legacy tone plan by a tone shift for all 26-tone, 52-tone, 106-tone and 242-tone RUs in the second and third 20 MHz bandwidth subchannels such that all 26-tone, 52-tone, 106-tone and 242-tone RUs in the second and third 20 MHz bandwidth subchannels do not overlap subchannel boundaries within the wireless channel.

28. The wireless station of claim 27, wherein the indication of the allocation comprises an indication of an allocation of all RUs in the second and third 20 MHz bandwidth subchannels regardless of puncturing of the first 20 MHz bandwidth subchannel, the fourth 20 MHz bandwidth subchannel, or both.

29. The wireless station of claim 24, wherein the first RU is a 26-tone, 52-tone, 106-tone, or 242-tone RU at an edge of the first 20 MHz bandwidth subchannel of the wireless channel, and wherein the second 20 MHz bandwidth subchannel of the wireless channel, adjacent to the first 20 MHz bandwidth subchannel, is punctured.

30. The wireless station of claim 24, further comprising:
at least one transceiver coupled to the at least one modem;
at least one antenna coupled to the at least one transceiver to wirelessly transmit signals output from the at least one transceiver and to wirelessly receive signals for input into the at least one transceiver; and
a housing that encompasses at least the at least one processor, the at least one modem, the at least one transceiver, and at least a portion of the at least one antenna.

* * * * *